(12) United States Patent
Shoji et al.

(10) Patent No.: US 11,129,045 B2
(45) Date of Patent: Sep. 21, 2021

(54) COMMUNICATION DEVICE AND COMMUNICATION METHOD

(71) Applicant: HITACHI KOKUSAI ELECTRIC INC., Tokyo (JP)

(72) Inventors: Tomoya Shoji, Tokyo (JP); Hiroshi Nakano, Tokyo (JP); Nobuyuki Uchikawa, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 105 days.

(21) Appl. No.: 15/781,821

(22) PCT Filed: Nov. 11, 2016

(86) PCT No.: PCT/JP2016/083553
§ 371 (c)(1),
(2) Date: Jun. 6, 2018

(87) PCT Pub. No.: WO2017/098859
PCT Pub. Date: Jun. 15, 2017

(65) Prior Publication Data
US 2018/0376368 A1 Dec. 27, 2018

(30) Foreign Application Priority Data
Dec. 8, 2015 (JP) .............................. JP2015-239611

(51) Int. Cl.
*H04W 28/02* (2009.01)
*H04W 84/18* (2009.01)
*H04W 88/04* (2009.01)

(52) U.S. Cl.
CPC ........ *H04W 28/0268* (2013.01); *H04W 84/18* (2013.01); *H04W 88/04* (2013.01)

(58) Field of Classification Search
None
See application file for complete search history.

(56) References Cited

U.S. PATENT DOCUMENTS

| 2003/0002511 A1* | 1/2003 | Ohba ................... H04L 45/04 370/400 |
| 2007/0204316 A1 | 8/2007 | Inamura et al. |

(Continued)

FOREIGN PATENT DOCUMENTS

| JP | 2006-086605 A | 3/2006 |
| JP | 2006-121410 A | 5/2006 |

(Continued)

OTHER PUBLICATIONS

International Search Report dated Dec. 14, 2016.

*Primary Examiner* — Christopher M Crutchfield
*Assistant Examiner* — Alan L Lindenbaum
(74) *Attorney, Agent, or Firm* — Bacon & Thomas, PLLC

(57) ABSTRACT

In a communication device and a communication method, multiple pieces of QoS control information are stored in a routing information base, each piece of QoS control information, with a terminal wired to the communication device itself as a transmission source, defining a bandwidth control value and a priority degree that correspond to communication data specified by a combination of the transmission source and a destination. When communication data is inputted, a control unit selects QoS control information that matches a combination of the transmission source and the destination of the inputted communication data from among the stored multiple pieces of QoS control information and indicates a bandwidth to a bandwidth control unit on the basis of the selected QoS control information, indicates a priority degree to a DSCP marking unit, and performs wireless transmission.

4 Claims, 27 Drawing Sheets

(56) References Cited

U.S. PATENT DOCUMENTS

2012/0087255 A1\* 4/2012 Ukita .................. H04L 12/4625
370/252
2012/0163171 A1\* 6/2012 Lee ....................... H04W 40/12
370/231

FOREIGN PATENT DOCUMENTS

JP    2007-228317 A    9/2007
WO    2010/150457 A1   12/2010

\* cited by examiner

FIG.3

QoS SETTING SCREEN DISPLAY EXAMPLE

QoS CONTROL

SETTING

BANDWIDTH CONTROL

| NO | SOURCE IP ADDRESS | DESTINATION IP ADDRESS | BANDWIDTH UPPER LIMIT |
|---|---|---|---|
| 1 | 192.168.0.1/32 | 192.168.1.1/32 | 1Mbps |
| 2 | 192.168.0.0/24 | 192.168.2.0/24 | 0.5Mbps |
| 3 | 192.168.0.2/32 | 192.168.3.0/24 | 0.3Mbps |
|   |   |   |   |
|   |   |   |   |
|   |   |   |   |
|   |   |   |   |

SETTING

PRIORITY DEGREE CONTROL

| NO | SOURCE IP ADDRESS | DESTINATION IP ADDRESS | PRIORITY DEGREE |
|---|---|---|---|
| 1 | 192.168.0.1/32 | 192.168.1.1/32 | 1 (HIGHEST) |
| 2 | 192.168.0.0/24 | 192.168.2.0/24 | 2 (HIGH) |
| 3 | 192.168.0.2/32 | 192.168.3.0/24 | 4 (LOWEST) |
|   |   |   |   |
|   |   |   |   |
|   |   |   |   |
|   |   |   |   |

SETTING

FIG.4
BANDWIDTH CONTROL TABLE

| NO | SETTING DEVICE INFORMATION | SOURCE IP ADDRESS | DESTINATION IP ADDRESS | BANDWIDTH SETTING |
|---|---|---|---|---|
| 1 | DEVICE ITSELF (COMMUNICATION DEVICE #2) | 192.168.0.1/32 | 192.168.1.1/32 | 1Mbps |
| 2 | DEVICE ITSELF (COMMUNICATION DEVICE #2) | 192.168.0.0/24 | 192.168.2.0/24 | 0.5Mbps |
| 3 | DEVICE ITSELF (COMMUNICATION DEVICE #2) | 192.168.0.2/32 | 192.168.3.0/24 | 0.3Mbps |

FIG.5
PRIORITY DEGREE CONTROL TABLE

| NO | SETTING DEVICE INFORMATION | SOURCE IP ADDRESS | DESTINATION IP ADDRESS | PRIORITY DEGREE VALUE |
|---|---|---|---|---|
| 1 | DEVICE ITSELF (COMMUNICATION DEVICE #2) | 192.168.0.1/32 | 192.168.1.1/32 | 1 (HIGHEST) |
| 2 | DEVICE ITSELF (COMMUNICATION DEVICE #2) | 192.168.0.0/24 | 192.168.4.0/24 | 2 (HIGH) |
| 3 | DEVICE ITSELF (COMMUNICATION DEVICE #2) | 192.168.0.2/32 | 192.168.3.0/24 | 4 (LOWEST) |

FIG.6A
QoS ENTRY EXAMPLE

| NO | SETTING DEVICE INFORMATION | SOURCE IP ADDRESS (Qos Entry Source Address) | DESTINATION IP ADDRESS (Qos Entry Dest Address) | BANDWIDTH CONTROL VALUE (BandWidth ControlValue) | PRIORITY DEGREE VALUE (Servic Control Value) | BANDWIDTH CONTROL PRIORITY DEGREE |
|---|---|---|---|---|---|---|
| 1 | COMMUNICATION DEVICE #2 (COMMUNICATION DEVICE ITSELF) | 192.168.0.1/32 | 192.168.1.1/32 | 1Mbps | 1 (HIGHEST) | 1 |
| 2 | COMMUNICATION DEVICE #2 (COMMUNICATION DEVICE ITSELF) | 192.168.0.0/24 | 192.168.2.0/24 | 0.5Mbps | 2 (HIGH) | 2 |
| 3 | COMMUNICATION DEVICE #2 (COMMUNICATION DEVICE ITSELF) | 192.168.0.2/32 | 192.168.3.0/24 | 0.3Mbps | 255 (NO CONTROL) | 3 |
| 4 | COMMUNICATION DEVICE #2 (COMMUNICATION DEVICE ITSELF) | 192.168.0.0/24 | 192.168.4.0/24 | – | 4 (LOWEST) | 4 |
| 5 | COMMUNICATION DEVICE #4 (NEIGHBORHOOD NODE) | 192.168.10.1/32 | 192.168.11.1/32 | 3Mbps | 1 (HIGHEST) | 31 |

FIG.6B
QoS ENTRY EXAMPLE

| (A) | (B) | (C) | (D) | (E) | (F) | (G) | (H) |
|---|---|---|---|---|---|---|---|
| 6 | | COMMUNICATION DEVICE #4 (NEIGHBORHOOD NODE) | 192.168.10.2/32 | 192.168.11.1/32 | 0.25Mbps | 2 (HIGH) | 32 |
| 7 | | COMMUNICATION DEVICE #4 (NEIGHBORHOOD NODE) | 192.168.10.2/32 | 192.168.11.1/32 | 0.5Mbps | 3 (LOW) | 33 |
| 8 | | COMMUNICATION DEVICE #5 (2 HOP NODE) | 192.168.20.1/32 | 192.168.0.1/32 | 1Mbps | 3 (LOW) | 61 |
| 9 | | COMMUNICATION DEVICE #5 (2 HOP NODE) | 192.168.20.0/24 | 192.168.0.0/24 | 0.5Mbps | 4 (LOWEST) | 62 |

QoS CONTROL NOTIFICATION MESSAGE FORMAT

FIG.8

QoS CONTROL MESSAGE EXAMPLE

| MESSAGE HEADER PORTION | | |
|---|---|---|
| 2[sec](msg Interval) | reserve | 15[sec] (QoS Control Timer) |
| reserve | | 0x01(entryNumber) |
| 1000[1Mbps] Control Value #1 | | 0x3F[HIGHEST] Control Value #1 |
| 192.168.0.1(QoS Entry Source Address #1) | | |
| 192.168.1.1(QoS Entry Dest Address #1) | | |
| 32 (Source NetMask #1) | | 32 (Dest NetMask #1) |

QoS CONTROL HEADER PORTION: rows 1–2
QoS ENTRY: rows 3–6

QoS CONTROL SEQUENCE EXAMPLE

IMAGE OF RELAY IN AD HOC NETWORK

IMAGE OF LOGICAL CONNECTION BY Hello MESSAGE

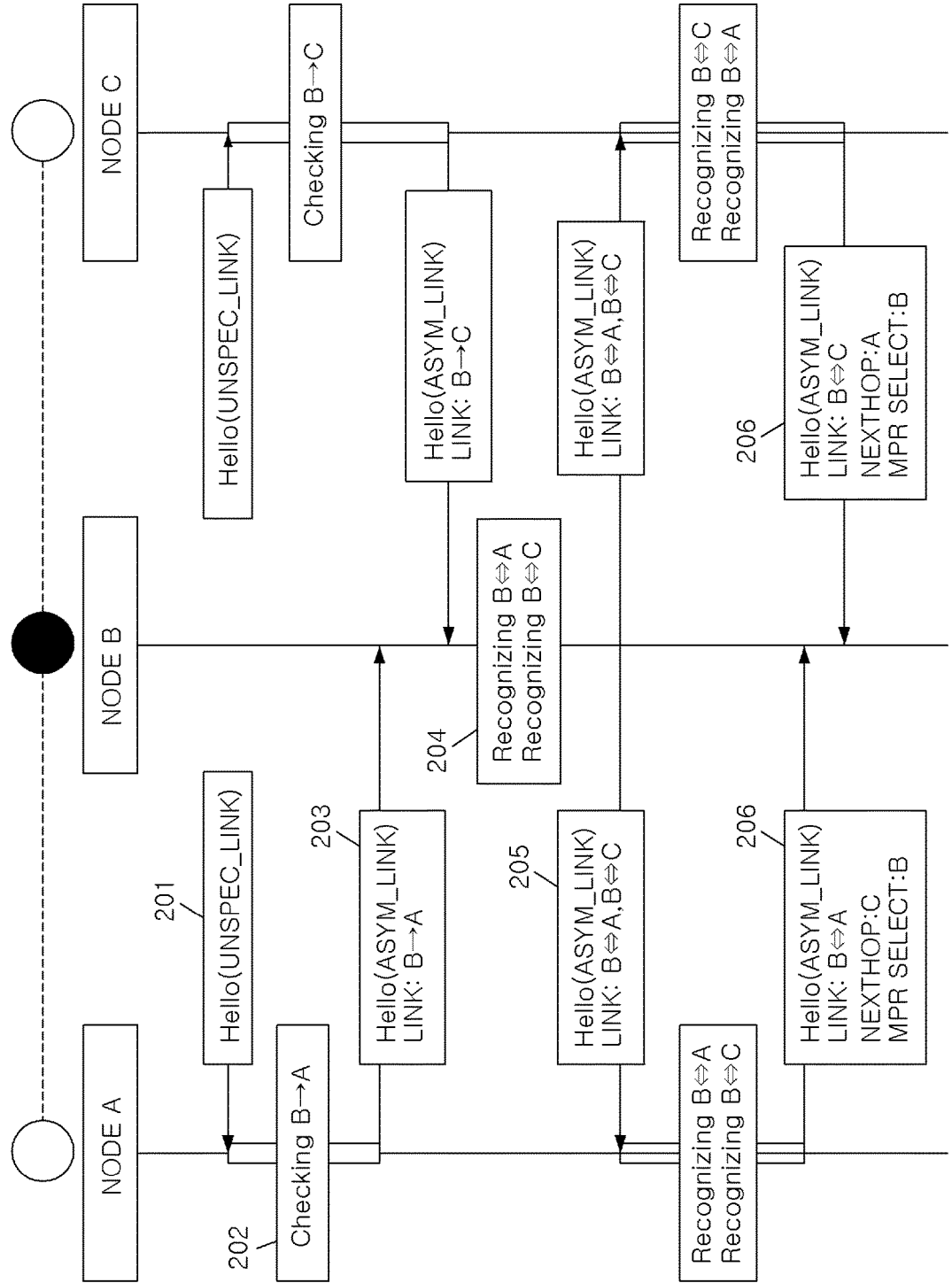

FIG.15
Hello MESSAGE FORMAT

| Stream Length || StreamSequence ||
|---|---|---|---|
| Msgtype | Invalid time | MsgLength ||
| Originator Address ||||
| MsgTTL | Hop Count | MsgSequence ||
| Reserve || Hello Interval | Willingness |
| LinkCode | Reaetve | LinkMessageSize ||
| Neighbor hood node Address#1 ||||
| Neighbor hood node Address#2 ||||
| LinkCode | Reaetve | LinkMessageSize ||
| Neighbor hood node Address#1 ||||
| Neighbor hood node Address#2 ||||

TC MESSAGE FORMAT

| Stream Length | | StreamSequence |
|---|---|---|
| Msgtype | Invalid time | MsgLength |
| Originator Address | | |
| MsgTTL | Hop Count | MsgSequence |
| ADV Sequence | | Reaetve |
| Advertised Neighbor node Address#1 | | |
| Advertised Neighbor node Address#2 | | |

⋮

FLOODING OF TC MESSAGE

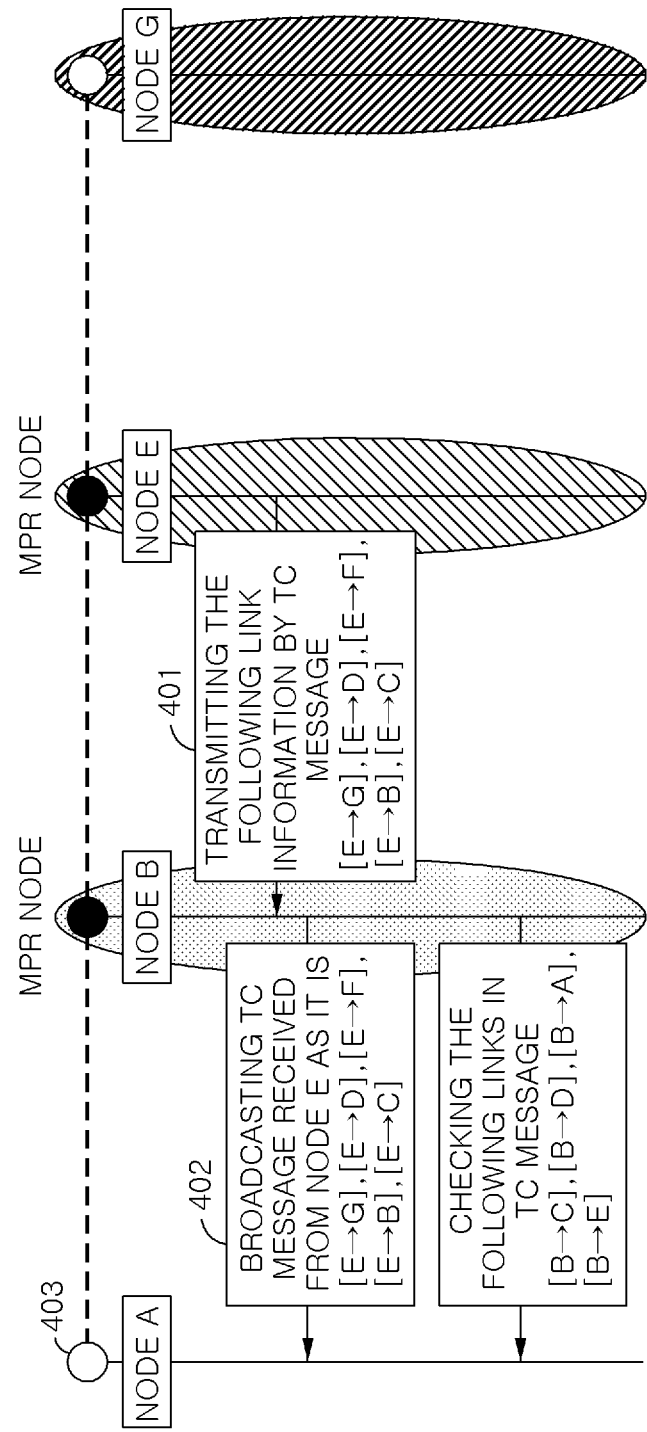

ROUTE DETERMINATION BY TC MESSAGE

ROUTE DETERMINATION BY TC MESSAGE

IMAGE OF ROUTE NOTIFICATION BY HNA

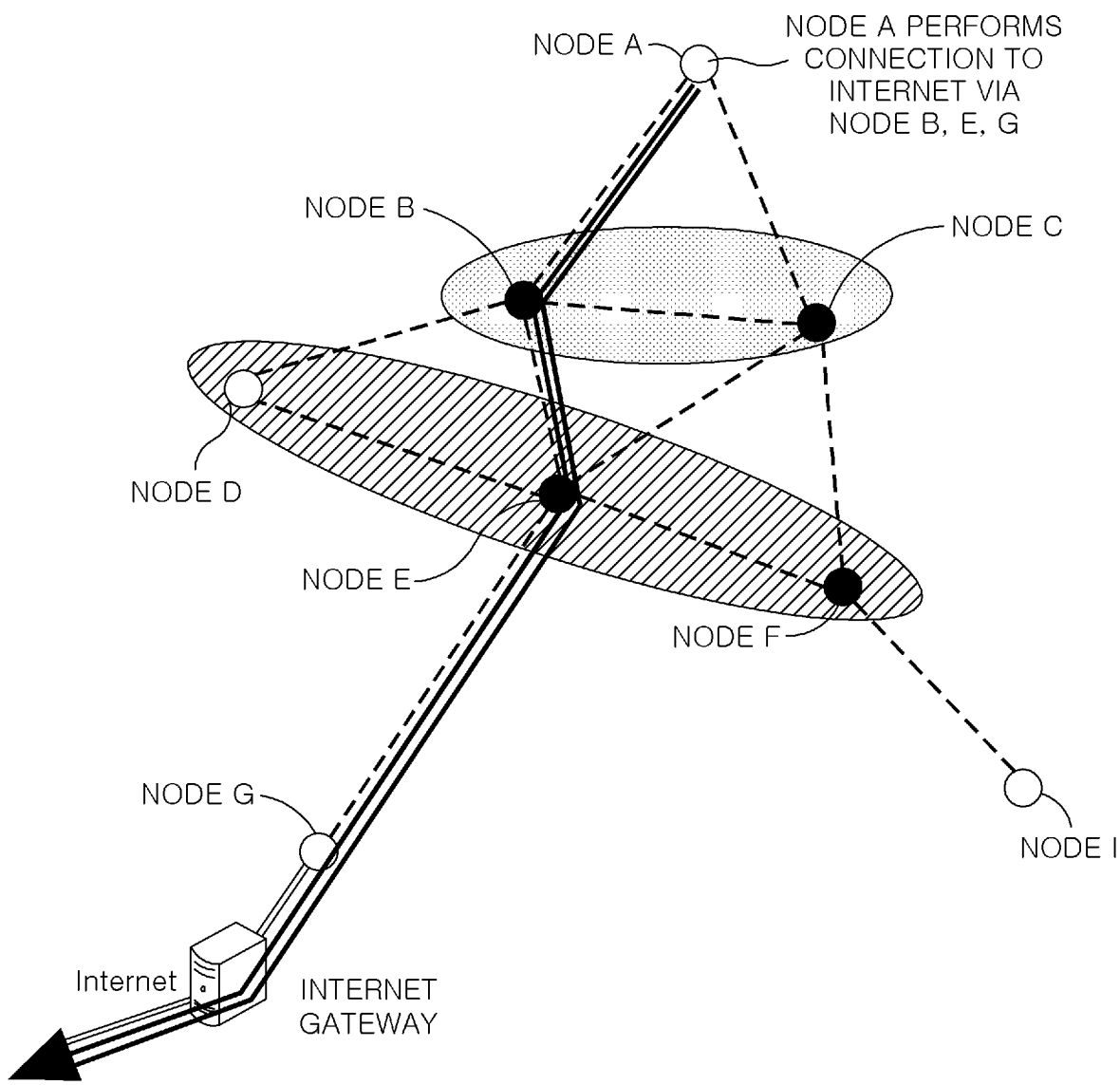

FIG.20

HNA MESSAGE FORMAT

| Stream Length | | StreamSequence |
|---|---|---|
| Msgtype | Invalid time | MsgLength |
| Originator Address | | |
| MsgTTL | Hop Count | MsgSequence |
| Network Address#1 | | |
| NetMask #1 | | |
| Network Address#2 | | |
| NetMask #2 | | |

⋮

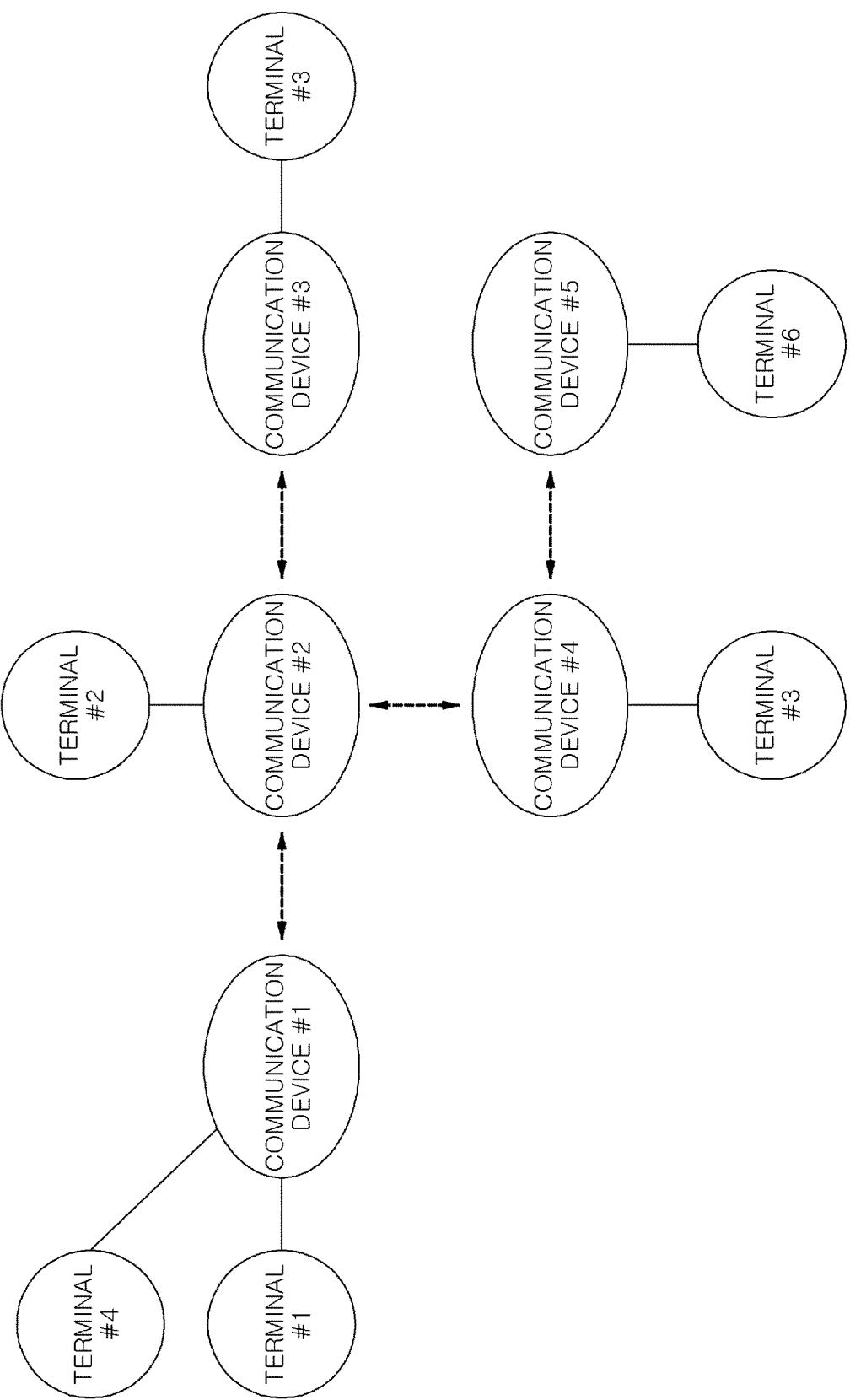

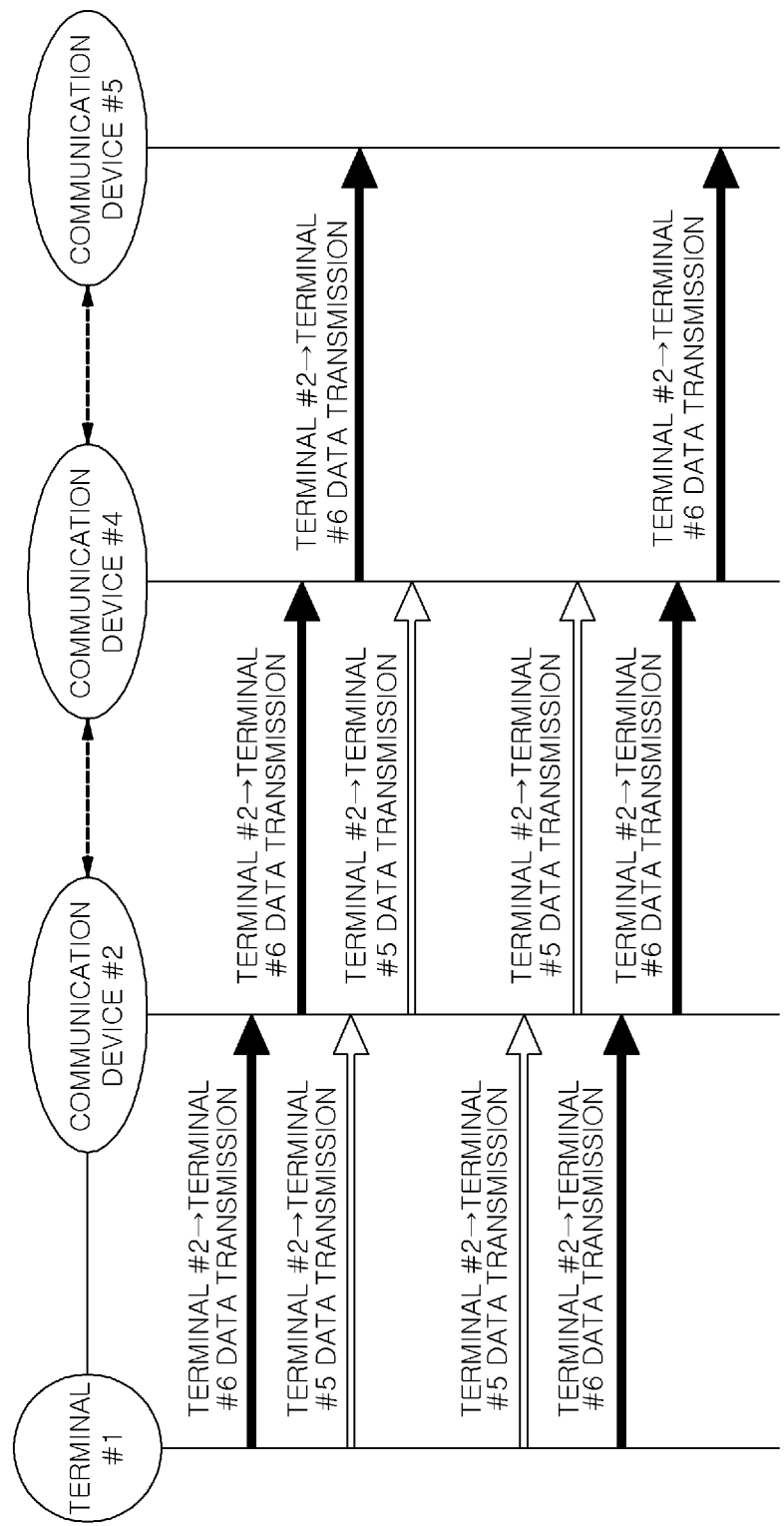

COMMUNICATION DEVICE AND COMMUNICATION METHOD

FIELD OF THE INVENTION

The present invention relates to a wireless communication system which makes use of ad hoc routing and, particularly, to a communication device and a communication method in which QoS information is shared by all communication devices, and QoS control is performed in the entire transmission route including terminals wire-connected to communication devices constituting a network, thereby enabling realization of various kinds of services.

BACKGROUND OF THE INVENTION

Ad hoc routing is a method of autonomously detecting a terminal between mobile terminals by wireless communication using an ad hoc routing protocol including an OLSR (Optimize Link State Routing) protocol and an AODV (Ad hoc On-demand Distance Vector), implementing route optimization, and constructing an ad hoc wireless network.

The OLSR protocol is one of the mesh type (cotton-like link type) routing protocols studied by the MANET WG (Mobile Ad hoc Network Working Group) of IETF (International Engineering Task Force).

The OLSR protocol is a proactive type routing protocol. Since a route is determined before communication by exchanging control messages in advance, the OLSR protocol can immediately start relay at any time.

The control messages include a Hello message and a TC (Topology Control) message.

[Relay Operation in OLSR Protocol: FIG. 13]

A basic operation of the OLSR protocol will be described.

First, an image of relay in an ad hoc network will be described with reference to FIG. 13. FIG. 13 is a schematic explanatory diagram showing the concept of relay in an ad hoc network.

In FIG. 13, there is shown a state in which a communication area 1 of node A partially overlaps a communication area 2 of node C, and node B stays in the overlapping area.

That is, the node A and the node B stay in the communication area 1, and the node B and the node C stay in the communication area 2.

In this case, the data addressed to the node C sent from the node A is relayed by the node B and is sent to the node C.

In this way, by using ad hoc routing, each mobile terminal in the wireless network (ad hoc network) can directly or indirectly perform wireless communication with another mobile terminal.

As used herein the term "node" refers to a movable communication device forming a wireless network.

[Logical Connection by Hello Message: FIGS. 14A, 14B and 15]

Next, the logical connection by the Hello message of the OLSR protocol will be described with reference to FIGS. 14A, 14B and 15. FIGS. 14A and 14B are explanatory diagrams showing a logical connection by a Hello message. FIG. 14A is an explanatory diagram showing the concept of a logical connection, and FIG. 14B is an explanatory diagram showing a sequence example of a logical connection. FIG. 15 is an explanatory diagram showing the format of a Hello message.

The Hello message is a message periodically transmitted for the purpose of distributing information held by each node. Each node receives this message and performs the collection of peripheral information, the logical connection (local link) to the periphery and the determination of a relay node called MPR (Multi Point Relay).

The Hello message has a format as shown in FIG. 15.

As shown in FIG. 14A, when the node B stays in the area where the communication area of the node A and the communication area of the node C overlap, the node B is selected as an MPR (Multi Point Relay) by exchanging a Hello message. By establishing a mesh link, communication between the node A and the node C becomes possible.

The logical connection sequence will be described with reference to FIG. 14B. Although the sequence between the node A and the node B will be described here, the same processing is performed between the node C and the node B.

In an initial stage, the node B sets the link code (301 in FIG. 15) of the Hello message to UNSPEC-LINK (link state unknown) and transmits the UNSPEC LINK to the neighborhood node (node A) in order to appeal its presence (201).

The link code stores LINKTYPE information indicating the link status.

In FIG. 14B, the neighborhood node (node A) receives the Hello message from the node B and recognizes that the link from the source node B to its own node was constructed at this time (202). However, since it is not known that the link is a bidirectional link, a Hello message using ASYM-LINK (unidirectional link) as the ink code shown in FIG. 15 is transmitted to the neighborhood node (node B) at the next transmission cycle (203).

Then, since the node B that received the Hello message from the node A includes its own node as the target of the ASYM-LINK, the node B recognizes that the Hello message of the UNSPEC-LINK transmitted by itself was received by the neighborhood node (node A). Since the Hello message could be received from the neighborhood node (node A), the node B recognizes that a bidirectional link has been established with the node A (204).

Similarly, the node B recognizes that a bi-directional link has been established with the node C (204).

Then, in the next transmission cycle, the node B sets the link code to SYM-LINK (bidirectional link) and transmits a Hello message, which indicates that a bidirectional link has been established with the node A and the node C, to the neighborhood node (node A) (205).

The node A that has received the Hello message recognizes that a bidirectional link has been established with the transmission source and that the next neighborhood node (node C) is present before the transmission source.

Then, at the next transmission cycle, the node A transmits a Hello message in which the next neighborhood node (node C) of the node (node B) succeeded in constructing a bidirectional link is set as NEXTHOP and in which the link code is set as SYM-LINK (symmetric link), to the neighborhood node (node B) (206).

At that time, in order to notify that one of the neighborhood nodes is selected as the MPR (relay node), a Hello message in which the link code is set as MPRLINK is transmitted to the neighborhood node (node B). As a result, the node A has selected the node B as the MPR.

A similar Hello message is transmitted and received between the node B and the node C, and a bidirectional link is established.

In this way, a logical connection using a Hello message is performed.

[Format of TC Message: FIG. 16]

The TC message is a control message transmitted only by the node selected as the MPR and is used for notifying the configuration of the entire network.

The format of the TC message will be described with reference to FIG. 16. FIG. 16 is an explanatory diagram showing the format of the TC message.

As shown in FIG. 16, the TC message includes areas such as Msg TTL in which a value representing the lifetime of the message is stored and Advertised Neighbor Node in which the address of the neighborhood advertisement node is stored.

[Flooding of TC Message: FIGS. 17A and 17B]

The flooding (broadcast) of the TC message will be described with reference to FIGS. 17A and 17B. FIGS. 17A and 17B are explanatory diagrams showing the flooding of the TC message. FIG. 17A shows a state of the flooding of the TC message, and FIG. 17B shows a part of the processing sequence.

In FIGS. 17A and 17B, the node E selected as the MPR will be mainly described.

As shown in FIGS. 17A and 17B, the node E selected by the MPR selection in the Hello message sets the nodes (here, the nodes G, D, F, B and C), which have selected the node E as the MPR, as the Advertised Neighbor Node (see FIG. 16). The node E broadcast-transmits the Advertised Neighbor Node by having the Advertised Neighbor Node included in the TC message (401 in FIG. 17B).

The dotted line in FIG. 17A indicates that a logical connection (mesh link) is established, and the arrows indicate a state in which the TC message is broadcast.

The node B (MPR) having received the TC message from the node E acquires the advertised Neighbor Node of the received TC message and adds it to its own network topology information.

Since the node B itself is also the MPR, the node B decreases the Msg TTL (see FIG. 16) of the received TC message by one and broadcasts it as it is (402 in FIG. 17B).

Further, the node B broadcast-transmits the TC message in which the nodes (nodes A, C, D and E), which have selected the node B as the MPR, are set as the Advertised Neighbor Node (in FIG. 17B, "check the following links" is described) (403).

Since the node A having received the TC message from the node B is not MPR, rebroadcast is not performed. The node A acquires the information of the Advertised Neighbor Node from the received TC message and adds it to its own network topology information. The, the processing is completed.

These processes are similarly performed for other MPRs (e.g., the node F).

[Route Determination by TC Message: FIGS. 18A and 18B]

Next, route determination will be described with reference to FIGS. 18A and 18B. FIGS. 18A and 18B are explanatory diagrams showing an example of route determination based on the topology information acquired from the TC message. FIG. 18A shows a network configuration (topology) constructed based on the TC message. FIG. 18B shows a route from the node A to the node G.

Each node starts calculating a shortest route reaching each node from its own network topology information.

As shown in FIG. 18A, the respective nodes succeeded in receiving the TC message hold common network topology information (topology information, 501).

In the example shown in FIG. 18A, the link information of [B←D], [B←A], [E←G], [E←D], [E←F], [E←B], [E←C], [B←C] [B←E], [F←C], [F←E], [F←I], [C←F] and [C←A] is possessed as the topology information.

Based on this topology information 501, each node finds a shortest route reaching other nodes. Here, a case where the node A finds a route to the node G will be described as an example.

From the topology information 501, it is known that the node E is linked (logically connected) to the target node G. Therefore, the node A first extracts the information of [E⇔G].

Next, the node A extracts information on the node linked to the node E. Since the node A has selected the node B as the MPR for reaching the node E, the information of [B⇔E] is extracted here.

Similarly, the node A extracts [B⇔A] as the information for reaching the node B.

From the above, the link information necessary for the node A to reach the node G is [G⇔E⇔B⇔A]. As shown in FIG. 18B, based on this information, the node A determines the route to the node G.

As described above, in the OLSR, by using two control messages, i.e., the Hello message and the TC message, each node can freely communicate with all the nodes participating in the mesh network.

[Route Notification by HNA Message: FIGS. 19 and 20]

In the OLSR, there is a control message called HNA (Host and Network Association) message.

The HNA message is an auxiliary message used when the node functions as a gateway. By setting the information of a wired network in advance in the node serving as a gateway, it becomes possible to transmit the HNA message.

Route notification by the HNA message will be described with reference to FIGS. 19A and 19B. FIGS. 19A and 19B are explanatory diagrams showing the outline of route notification by the HNA message. FIG. 19A shows the state of the route notification by the HNA message. FIG. 19B shows the state of Internet connection according to the notification by the HNA message. FIG. 20 is an explanatory diagram showing the format of the HNA message.

As for transmission of the HNA message, the same flooding as the TC message is used. That is, the HNA message shown in FIG. 20 is broadcasted by the MPR just like the TC message. As the received MPR broadcasts again, the HNA message is notified to all the mobile terminals in the wireless network.

In the example of FIGS. 19A and 19B, there is shown an example in which an Internet gateway is connected to the front side of the node G.

As shown in FIG. 19A, the node G pre-registers the address of the Internet gateway.

Then, according to the HNA message, the node G notifies that the Internet gateway exists before the node G.

The node E (MPR) having received the HNA message from the node G broadcasts the HNA message to the node B, the node C, the node D and the node F in the same manner as the TC message.

The nodes of other MPRs broadcast in a similar manner. Therefore, it is possible to notify all the mobile terminals in the wireless network of the existence of the gateway.

Thus, for example, the node A can be connected to the Internet via the nodes B, E and G.

[Configuration of Conventional Communication Device: FIG. 21]

Next, the configuration of a conventional communication device and the relay of a control message will be described with reference to FIG. 21. FIG. 21 is a system configuration diagram showing the configuration of a conventional communication device.

FIG. 21 shows the system configuration of a communication device that relays a wired autonomous network and a wireless autonomous network (such as an ad hoc network or the like).

As shown in FIG. 21, in the conventional communication device, a network module 90 that implements an ad hoc routing protocol is arranged in and above a transport layer which is the layer 4 (L4). An ad hoc routing control unit 91, a control message transmitting unit 92, a control message receiving unit 93, a control message generating unit 94 and a routing information base 95 are arranged in the network module 90.

In the conventional communication device, the control message received by the control message receiving unit 93 is analyzed by the ad hoc routing control unit 91 and is stored in the routing information base 95.

Thereafter, the ad hoc routing control unit 91 extracts information from the routing information base 95 according to the preset control message transmission interval and delivers the information to the control message generating unit 94. The control message generated by the control message generating unit 94 is delivered to the control message transmitting unit 92 and is transmitted to the lower layers.

Further, based on the information stored in the routing information base 95, the ad hoc routing control unit 91 registers the communication route in a routing table 96 arranged in the network layer which is a layer 3 (L3).

When registering the route, the information on the destination IP address, the network identification flag (net mask), the IP address of the relay node (gateway), the scale of the route (metric), the output interface (Ethernet (registered trademark) PHY or Wireless Network PHY) and the like is required.

The route thus set is used for selecting the output interface.

When there is an IP packet input from the wired autonomous network 98, the communication device checks the communication route registered in the routing table 96 of itself. Thereafter, if there is a destination IP address of the IP packet matched with the communication route registered in its own routing table 16, an IP packet is outputted to the output interface set at the time of registration.

In addition, the routing table 96 also works similarly for the IP packet from the wireless interface 99.

At that time, the output destination of the route registered in the routing table may be both the wired autonomous network side interface and the wireless side interface.

Further, the communication device has a function of storing the information of the route matching the input data in a temporary storage area (routing table cache) 961.

[Conventional QoS Control]

General bandwidth control performed on a wired network including a WAN (Wide Area Network) or the like is established by the negotiation with a network administrator as a master station.

For this reason, it is often realized by the negotiation between network tools and materials such as routers or the like and the control by a dedicated server. It is difficult to apply to an ad hoc network in which a mobile terminal dynamically constructs a network.

That is, conventionally, QoS (Quality of Service) control information related to bandwidth control and communication priority can be transmitted to a terminal wire-connected to the communication device serving as a node. However, the QoS control information cannot be transmitted to other communication devices wirelessly connected to the communication device serving as a node.

Although QoS guarantee including QOLSR is being studied, it is aimed at guaranteeing communication between communication devices. No mention is made of a transmission route including a terminal connected to a communication device.

Further, there is a method called DiffServ for the conventional QoS control.

The DiffServ method determines an information priority degree of an IP packet according to the information contents of a DSCP (Differentiated Service Code Point) existing in the ToS field inside the IP packet.

Depending on the communication device, the content of the DSCP may be rewritten (marked) by using the source address, the destination address and the information of the upper protocol in the IP packet.

[Conventional Communication Example: FIGS. 22A and 22B]

An example of communication in a conventional network will be described with reference to FIGS. 22A and 22B. FIGS. 22A and 22B are explanatory diagrams showing an example of communication in a conventional network. FIG. 22A shows a network configuration, and FIG. 22B shows an example of a communication sequence.

In the example shown in FIG. 22A, communication devices #1 to #5 constitute an ad hoc network, and terminals are connected to each communication device by a wired network.

Next, a case where terminal #2 connected to communication device #2 communicates with terminal #5 and terminal #6 will be described as an example.

In this example, it is assumed that the communication of terminal #2-terminal #6 has a high priority degree and the communication of terminal #2-terminal #5 has a low priority degree.

However, in the conventional communication devices, the information on the priority degree and the bandwidth limitation is not shared between the communication devices. Therefore, as shown in FIG. 22B, each communication device merely performs relay processing in a time series and does not place priority on the communication of terminal #2-terminal #6.

RELATED ART

As the related art related to a wireless communication network, there are Japanese Patent Application Publication No. 2005-72720 entitled "communication network system, communication route selection device and information communication method" (Sony Corporation, Patent Document 1), Japanese Patent Application Publication No. 2005-101872 entitled "network control method, network system and wireless terminal" (SANYO Electric Co., Ltd., Patent Document 2), Japanese Patent Application Publication No. 2007-228317 entitled "video monitoring system" (Toshiba Corporation, Patent Document 3), and Japanese Patent Application Publication No. 2009-253927 entitled "network management device, network management method and monitoring system" (Sony Corporation, Patent Document 4).

Patent Document 1 described that when a terminal subscribing to an ad hoc communication network has a plurality of routes for accessing an external network, a node directly connected to the terminal selects an optimum communication route by comparing the communication quality required according to the data inputted from the terminal with the communication quality of each route.

Patent Document 2 describes that in an ad hoc network, a terminal requesting transmission of contents generates a policy on a service quality based on the inputted required quality and multicasts the policy in the network, and another terminal receives the policy and selects an optimum control method out of a plurality of communication control methods owned by itself to hop-transmit the contents.

Patent Document 3 describes a system that transmits video data and non-video data via a multi-hop wireless network, wherein network resources are preferentially allocated to the video data.

Patent Document 4 describes that, in an ad hoc communication network, route information and link quality information are acquired from a plurality of wireless terminals and are used for displaying the current state and managing the network.

Patent Document 1: Japanese Patent Application Publication No. 2005-72720

Patent Document 2: Japanese Patent Application Publication No. 2005-101872

Patent Document 3: Japanese Patent Application Publication No. 2007-228317

Patent Document 4: Japanese Patent Application Publication No. 2009-253927

SUMMARY OF THE INVENTION

However, in the network using the conventional ad hoc routing protocol, QoS control cannot be performed on the entire transmission route including the terminals connected to the respective communication devices. Therefore, there is a problem that it is impossible to perform the control of communication bandwidth and to select the priority degree of communication and it is impossible to realize various kinds of services.

Patent Documents 1 to 4 do not describe that QoS control is performed on the entire transmission route including the terminal wire-connected to the communication terminal constituting the network.

The present invention has been made in view of the above circumstances. It is an object of the present invention to provide a communication device and a communication method in which, in a network using an ad hoc routing protocol, QoS information is shared by all communication devices, and QoS control is performed in the entire transmission route including terminals connected to communication devices, thereby enabling realization of various kinds of services.

In accordance with an aspect of the present invention, there is provided a communication device, for performing communication with a terminal connected to the communication device itself by a wired network and for performing wireless communication with communication devices in a wireless network formed by the communication devices, including: a storage unit configured to use the terminal as a transmission source and configured to store multiple pieces of QoS control information each defining a bandwidth control value in correspondence to communication data specified by a combination of the transmission source and a destination; a control unit configured to perform QoS control of communication data based on the QoS control information; and a bandwidth control unit configured to perform bandwidth control of transmission data in wireless communication according to an instruction, wherein when communication data is inputted, the control unit selects QoS control information corresponding to a combination of a transmission source and a destination of the communication data from among the multiple pieces of QoS control information stored in the storage unit and specifies a bandwidth control value defined by the selected QoS control information with respect to the bandwidth control unit.

The communication device may further include a priority degree control unit configured to control a priority degree of communication data, wherein a priority degree in addition to a bandwidth control value is defined in the QoS control information, and when communication data is inputted, the control unit selects QoS control information corresponding to a combination of a transmission source and a destination of the communication data from among the multiple pieces of QoS control information stored in the storage unit and specifies a priority degree defined by the selected QoS control information with respect to the priority degree control unit.

In the communication device, when communication data is inputted, the control unit may determine whether or not a destination of the communication data is a terminal connected to the communication device itself by a wired network, and if the destination of the communication data is not the terminal connected to the communication device itself by the wired network, the control unit may instruct the priority degree control unit to perform a marking process for rewriting priority degree information contained in the communication data to a priority degree defined by QoS control information corresponding to a transmission source and a destination, and if the destination of the communication data is the terminal connected to the communication device itself by the wired network, the control unit may instruct the priority degree control unit to perform a re-marking process for rewriting priority degree information contained in the communication data to a priority degree set in advance in the wired network.

Further, in the communication device, the storage unit may store QoS control information received from another communication device in addition to QoS control information set from the communication device itself, the control unit may set a bandwidth control priority degree indicating a priority degree of bandwidth control in the communication device itself with respect to each of the multiple pieces of QoS control information, and during the setting, the control unit may set a bandwidth control priority degree of the QoS control information set from the communication device itself to become higher than a bandwidth control priority degree of the QoS control information received from another communication device and store the set bandwidth control priority degree in the storage unit, and when communication data is inputted, a bandwidth control value is specified with respect to the bandwidth control unit according to a bandwidth control priority degree of QoS control information corresponding to a combination of a transmission source and a destination of the communication data.

In accordance with another aspect of the present invention, there is provided a communication method in a communication device for performing communication with a terminal connected to the communication device itself by a wired network and for performing wireless communication with communication devices in a wireless network formed by the communication devices, wherein: the terminal is used as a transmission source, and multiple pieces of QoS control information each defining a bandwidth control value and a priority degree in correspondence to communication data specified by a combination of the transmission source and a destination are stored in advance in a storage unit; and when communication data is inputted from the terminal connected to the communication device itself, a control unit selects QoS control information corresponding to a combination of a transmission source and a destination of the communication data from among the multiple pieces of QoS control information stored in the storage unit and performs bandwidth control and priority degree control based on a bandwidth control value and a priority degree defined by the selected QoS control information.

Effects of the Invention

According to the present invention, a communication device for performing wireless communication with communication devices in a wireless network formed by the communication devices and for performing communication with a terminal connected to the communication device itself by a wired network, includes: a storage unit configured to use the terminal as a transmission source and configured to store multiple pieces of QoS control information each defining a bandwidth control value in correspondence to communication data specified by a combination of the transmission source and a destination; a control unit configured to perform QoS control of communication data based on the QoS control information; and a bandwidth control unit configured to perform bandwidth control of transmission data in wireless communication according to an instruction, wherein when communication data is inputted, the control unit selects QoS control information corresponding to a combination of a transmission source and a destination of the communication data from among the multiple pieces of QoS control information stored in the storage unit and specifies a bandwidth control value defined by the selected QoS control information with respect to the bandwidth control unit. Therefore, the transmission data from the terminal wire-connected to the communication device can be transmitted by wireless communication in an appropriate bandwidth, and bandwidth control can be realized in the entire transmission route including not only the communication device but also the wire-connected terminal.

Furthermore, according to the present invention, the communication device further includes: a priority degree control unit configured to control a priority degree of communication data, wherein a priority degree in addition to a bandwidth control value is defined in the QoS control information, and when communication data is inputted, the control unit selects QoS control information corresponding to a combination of a transmission source and a destination of the communication data from among the multiple pieces of QoS control information stored in the storage unit and specifies a priority degree defined by the selected QoS control information with respect to the priority degree control unit. Therefore, the transmission data from the terminal wire-connected to the communication device can be wirelessly transmitted in an appropriate bandwidth and priority degree. QoS control can be realized in the entire transmission route including not only the communication device but also the wire-connected terminal. This makes it possible to provide various kinds of services.

Furthermore, according to the present invention, when communication data is inputted, the control unit determines whether or not a destination of the communication data is a terminal connected to the communication device itself by a wired network, and if the destination of the communication data is not the terminal connected to the communication device itself by the wired network, the control unit instructs the priority degree control unit to perform a marking process for rewriting priority degree information contained in the communication data to a priority degree defined by QoS control information corresponding to a transmission source and a destination, and if the destination of the communication data is the terminal connected to the communication device itself by the wired network, the control unit instructs the priority degree control unit to perform a re-marking process for rewriting priority degree information contained in the communication data to a priority degree set in advance in the wired network. Therefore, it is possible to set an appropriate priority degree in both a wireless section and a wired section, and to guarantee the quality of communication in the entire transmission route.

Furthermore, according to the present invention, the storage unit is configured to store QoS control information received from another communication device in addition to QoS control information set from the communication device itself, the control unit sets a bandwidth control priority degree indicating a priority degree of bandwidth control in the communication device itself with respect to each of the multiple pieces of QoS control information, and during the setting, the control unit sets a bandwidth control priority degree of the QoS control information set from the communication device itself to become higher than a bandwidth control priority degree of the QoS control information received from another communication device and stores the set bandwidth control priority degree in the storage unit, and when communication data is inputted, a bandwidth control value is specified with respect to the bandwidth control unit according to a bandwidth control priority degree of QoS control information corresponding to a combination of a transmission source and a destination of the communication data. Therefore, the communication data transmitted from the terminal wire-connected to the communication device itself can be preferentially allocated a bandwidth and can be transmitted. This makes it possible to prevent congestion of communication.

In addition, according to the present invention, in a communication method in a communication device for performing wireless communication with communication devices in a wireless network formed by the communication devices and for performing communication with a terminal connected to the communication device itself by a wired network, the terminal is used as a transmission source, and multiple pieces of QoS control information each defining a bandwidth control value and a priority degree in correspondence to communication data specified by a combination of the transmission source and a destination are stored in advance in a storage unit, and when communication data is inputted from the terminal connected to the communication device itself, a control unit selects QoS control information corresponding to a combination of a transmission source and a destination of the communication data from among the multiple pieces of QoS control information stored in the storage unit and performs bandwidth control and priority degree control based on a bandwidth control value and a priority degree defined by the selected QoS control information. Therefore, the transmission data from the terminal wire-connected to the communication device can be wirelessly transmitted in an appropriate bandwidth and priority degree. QoS control can be realized in the entire transmission route including not only the communication device but also the wire-connected terminal. This makes it possible to provide various kinds of services.

BRIEF DESCRIPTION OF THE DRAWINGS

FIG. 3 is an explanatory diagram showing a display example of a QoS setting screen.

FIG. 4 is an explanatory diagram showing an example of a bandwidth control table.

FIG. 5 is an explanatory diagram of a priority degree control table.

FIGS. 6A and 6B are an explanatory diagram showing an example of a QoS entry of communication device #2.

FIG. 8 is an explanatory diagram of a QoS control notification message showing QoS control information for an IP packet transmitted from terminal #2 to terminal #6 shown in FIG. 2.

FIGS. 14A and 14B are explanatory diagrams showing a logical connection by a hello message.

FIG. 15 is an explanatory diagram showing a format of a Hello message.

FIG. 16 is an explanatory diagram showing a format of a TC message.

FIGS. 17A and 17B are explanatory diagrams showing the flooding of a TC message.

FIGS. 19A and 19B are explanatory diagrams showing an outline of route notification by an HNA message.

FIG. 20 is an explanatory diagram showing a format of an HNA message.

FIGS. 22A and 22B are explanatory diagrams showing an example of communication in a conventional network.

DETAILED DESCRIPTION OF THE EMBODIMENTS

Figure 1:
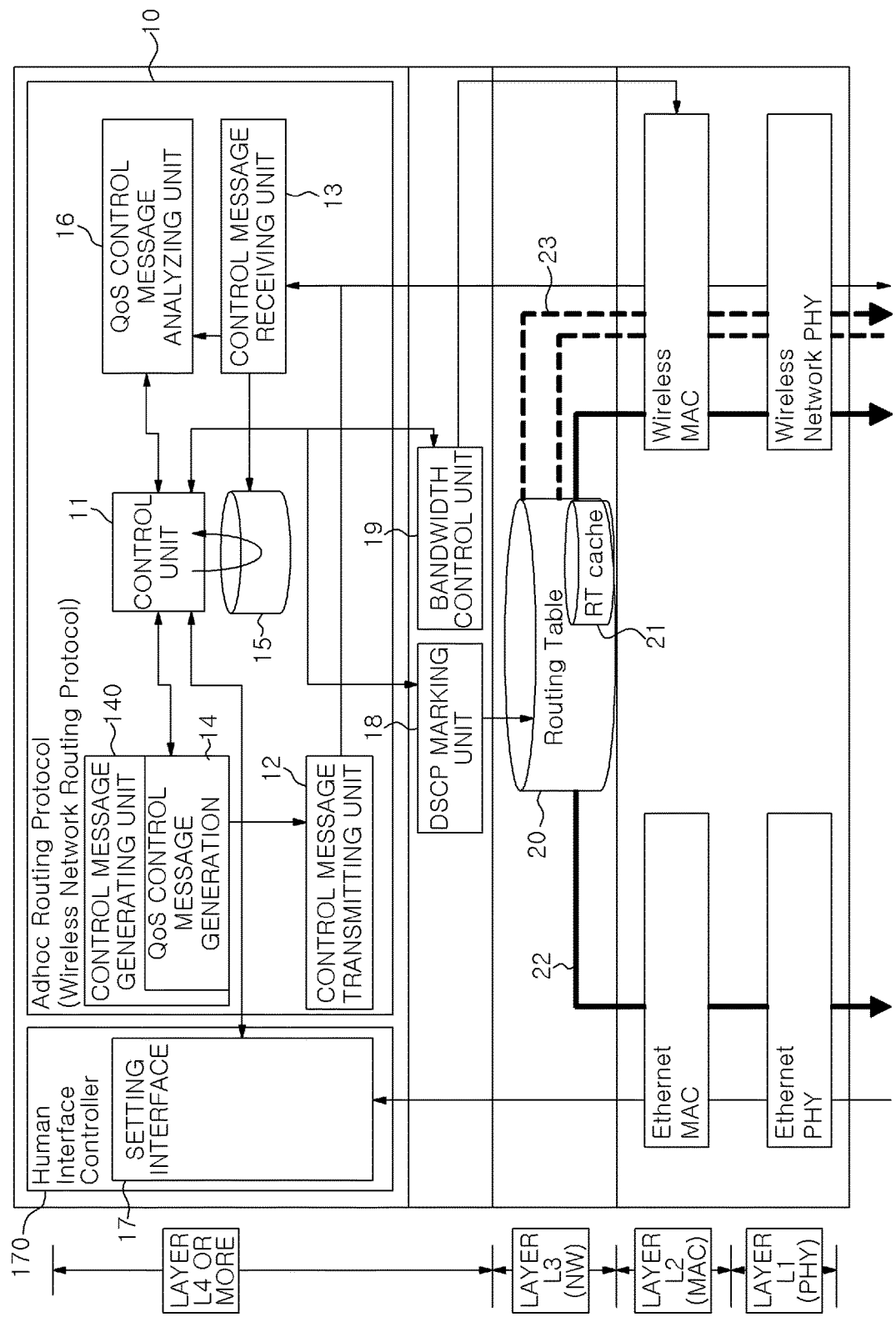
FIG. 1 is a system configuration diagram of a communication device according to an embodiment of the present invention.

Embodiments of the present invention will be described with reference to the drawings.

Outline of Embodiment

According to the communication device and the communication method according to an embodiment of the present invention, in a communication device including a wire-connected terminal, multiple pieces of QoS control information (QoS entry information) that define a bandwidth control value and a priority degree corresponding to communication data specified by a combination of a transmission source and a destination are stored in a storage unit. When communication data is inputted from the wire-connected terminal, bandwidth control or bandwidth control and priority degree control is performed based on QoS control information matching a combination of a transmission source and a destination of the inputted communication data among the multiple pieces of QoS control information stored in the storage unit, thereby performing wireless communication. Not only communication devices that construct a network but also terminals connected to the respective communication devices can be set as the transmission source and the destination. This makes it possible to realize QoS control in the entire network, thereby providing various kinds of services.

In addition, the communication device according to the present embodiment includes an interface for inputting QoS control information from the outside. When the QoS control information is inputted through the interface, the communication device stores the QoS control information in a storage unit and notifies another communication device of the QoS control information by storing the QoS control information in a control message according to an ad hoc routing protocol. Upon receiving the QoS control information from another communication device, the communication device stores the contents of the QoS control information in the storage unit. Therefore, the same QoS control information can be shared by the communication devices in the network, and QoS control can be realized in the entire network, thereby providing various kinds of services.

Furthermore, the communication device according to the present embodiment is a communication device including a wire-connected terminal. Upon receiving communication data from another communication device, the communication device determines whether the destination of the communication data is a terminal wire-connected to the communication device itself. If the destination is not a terminal wire-connected to the communication device itself, a marking process for rewriting the DSCP of the communication data based on QoS control information is performed. If the destination of the communication data is a terminal wire-connected to the communication device itself, a re-marking process for rewriting the DSCP of the communication data at a priority degree set in advance by a wired interface is performed. Therefore, even in a wireless section and a wired section, communication can be performed at an appropriate priority degree.

[Configuration of Communication Device According to Embodiment: FIG. 1]

The configuration of a communication device (main communication device) according to an embodiment of the present invention will be described with reference to FIG. 1. FIG. 1 is a system configuration diagram of a communication device according to an embodiment of the present invention.

Figure 21:
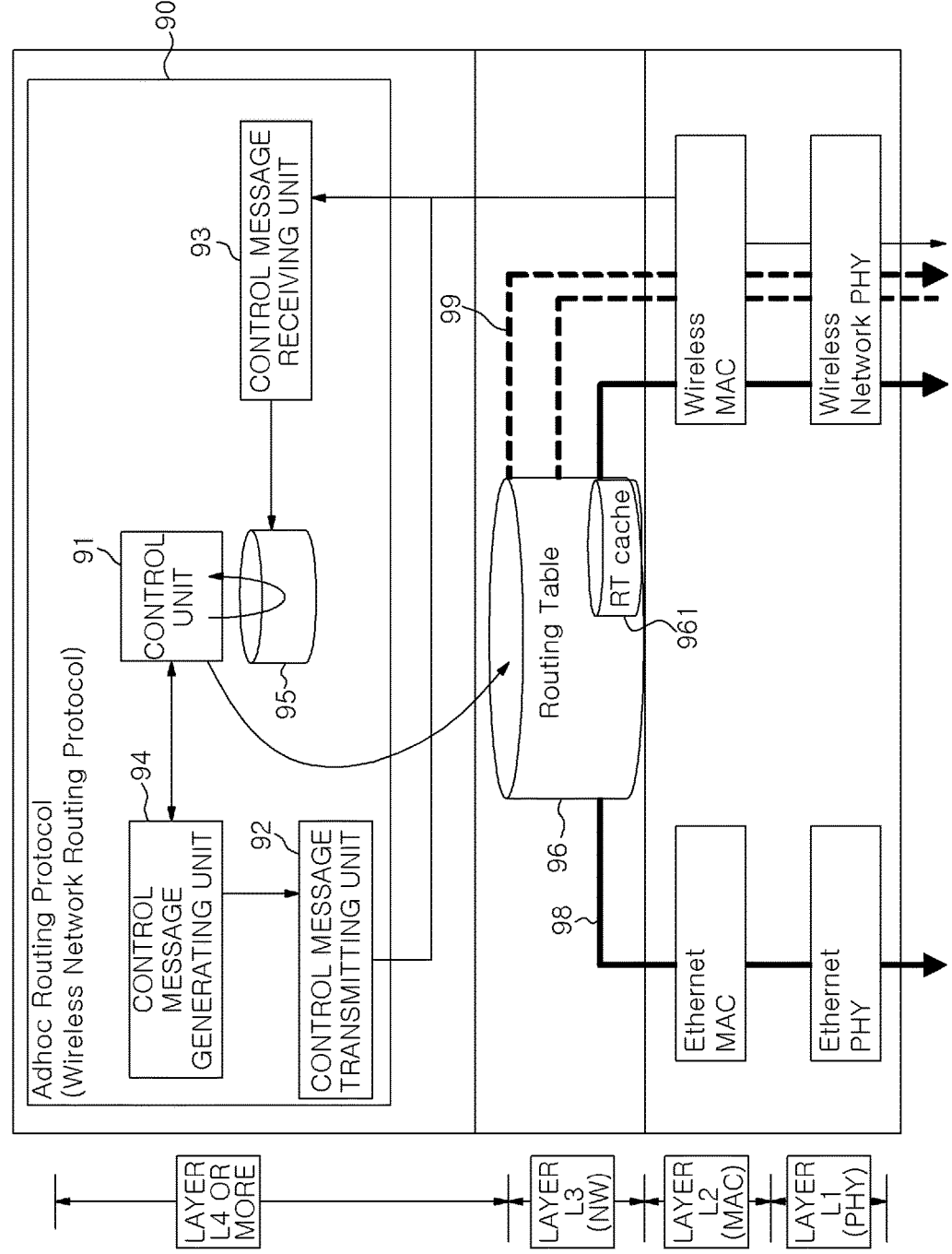
FIG. 21 is a system configuration diagram showing a configuration of a conventional communication device.

As shown in FIG. 1, the basic configuration of this communication device is almost the same as that of the conventional communication device shown in FIG. 21. However, a constituent part for performing QoS control is newly added.

In the present communication device, as the same constituent part as that of the prior art, a network module 10 that implements an ad hoc routing protocol is arranged in and above a layer 4 (L4). An ad hoc routing control unit (hereinafter referred to as "control unit") 11, a control message transmitting unit 12, a control message receiving unit 13, a control message generating unit 14 and a routing information base 15 are arranged in the network module 10.

However, the operation in the control unit 11 and the information stored in the routing information base 15 are partly different from the conventional one.

A routing table 20 for storing information on a communication route is provided in a layer L3 (network layer). A wired interface 22 and a wireless interface 23 are connected to the routing table 20.

As in the prior art, the routing table 20 is provided with a routing table cache 21 for temporarily holding information on a route that matches input data.

As the characteristic parts of the present communication device, a QoS control message analyzing unit 16, a setting interface 17 in an interface module (described as "Human Interface Controller" in FIG. 1) 170, and a QoS control message generating unit 14 in a control message generating unit 140 are provided in and above the layer L4.

Furthermore, as the characteristic parts of the present communication device, a DSCP marking unit 18 and a bandwidth control unit 19 are provided in and above the layer L4.

The characteristic parts of the present communication device will be described.

The setting interface 17 is an interface for the administrator to input the QoS control information (QoS entry information) which is a feature of the present communication device and is provided with a display screen and an input means.

The QoS control message analyzing unit 16 analyzes a QoS control notification message transmitted from another communication device and extracts QoS control information.

The routing information base 15 stores a bandwidth control table and a priority degree control table, which are generated based on the QoS control information inputted via the setting interface 17 or the control message analyzing unit 16, and a QoS entry.

The control message generating unit 140 generates a Hello message and a TC message in the same manner as in the prior art. The QoS control message generating unit 14, which is a feature of the present communication device, generates a QoS control notification message.

The DSCP marking unit 18 is a characteristic part of the present communication device and is configured to control the priority degree of communication data. The DSCP marking unit 18 corresponds to a priority degree control unit recited in the claims.

Specifically, the DSCP marking unit 18 performs a marking process for rewriting a DSCP value in a ToS field of a header portion with respect to an IP packet according to an instruction from the control unit 11. The DSCP value is information indicating the priority degree of a packet.

Thus, the priority degree of the IP packet can be controlled.

Further, when the destination is a terminal on a wired network connected to the communication device itself, the DSCP marking unit 18 performs a re-marking process for restoring a marked DSCP value to a DSCP value of an IP packet conventionally used in a wired network according to an instruction from the control unit 11.

The DSCP value of an IP packet conventionally used is information on a priority degree set originally through wired communication between the communication device and the terminal with respect to the combination of a transmission source and a destination.

As a result, the priority degree can be held inside the wired network in which priority degree control has been conventionally performed.

In accordance with an instruction from the control unit 11, the bandwidth control unit 19 performs bandwidth control for securing a communication bandwidth of an IP packet.

[Outline of Operation of the Communication Device]

The pressure communication device broadly performs an operation of registering QoS control information and storing the QoS control information so as to be shared between devices, and an operation of controlling a bandwidth and a priority degree of an IP packet based on the stored QoS control information in actual communication.

The respective operations will be described later.

Figure 2:
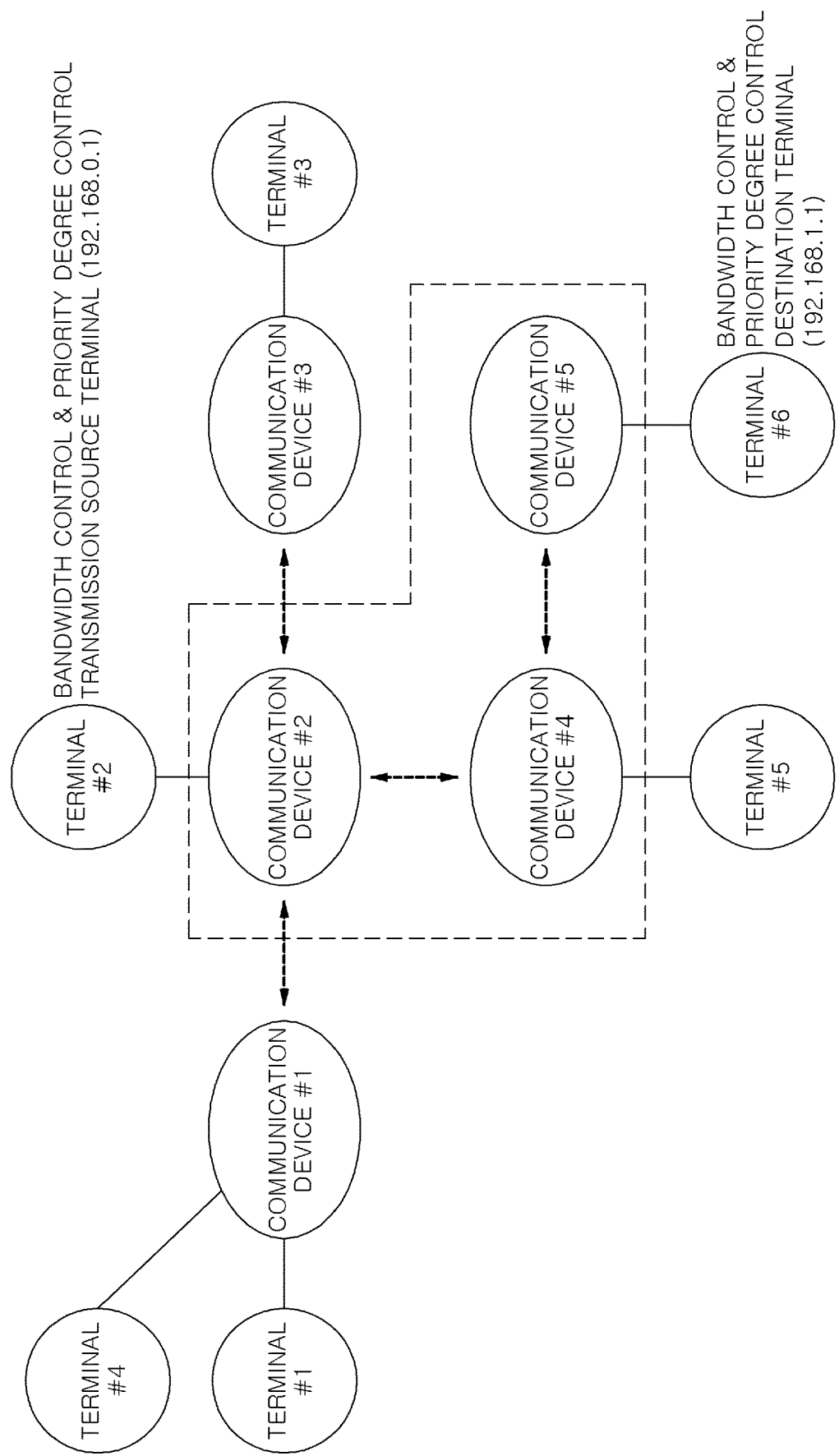
FIG. 2 is an explanatory diagram showing a configuration example of a network in which the present communication device is arranged.

[Network Configuration: FIG. 2]

In order to explain the operation of the present communication device, a configuration example of a network in which the present communication device is arranged will be described with reference to FIG. 2. FIG. 2 is an explanatory diagram showing a configuration example of a network in which the present communication device is arranged.

The network shown in FIG. 2 has the same configuration as the network shown in FIG. 22A and includes communication devices #1, #2, #3, #4 and #5.

Furthermore, terminal #1 and terminal #4 are wire-connected to communication device #1. Terminal #2 is wire-connected to communication device #2. Terminal #3 is wire-connected to communication device #3. Terminal #5 is wire-connected to communication device #4 Terminal #6 is wire-connected to communication device #5.

Communication device #2 is MPR-selected from communication devices #1, #3 and #4, and communication device #4 is MPR-selected from communication devices #2 and #5.

In the following description, a case where the bandwidth and the priority degree are controlled in order to preferentially transmit communication data from terminal #2 to terminal #6 will be described as an example.

The IP address of terminal #2 as a transmission source is 192.168.0.1, and the IP address of terminal #6 as a destination is 192.168.1.1.

[QoS Setting Screen Display Example: FIGS. 1 and 3]

Next, a QoS setting screen display example of the present communication device will be described with reference to FIGS. 1 and 3 while exchanging operations. FIG. 3 is an explanatory diagram showing a display example of a QoS setting screen.

As shown in FIG. 3, the QoS setting screen is displayed on a processing device such as a PC operated by an administrator. The information for generating QoS control information is inputted to the QoS setting screen. The QoS setting screen is expressed by the setting interface unit 17 shown in FIG. 1.

In this regard, the QoS control information set on the QoS setting screen is the QoS control information of communication in which the communication device or the terminal wire-connected to the communication device serves as a transmission source.

In the present communication device, the bandwidth and the priority degree are controlled as QoS control.

As for the bandwidth control, a desired bandwidth upper limit value is inputted in correspondence to the set of a transmission source IP address and a destination IP address.

In the example of FIG. 3, in the communication from terminal #2 (192.168.0.1/32) to terminal #6 (192.168.1.1/32) indicated as number 1, an upper limit bandwidth of "1 Mbps" is set, and a wide bandwidth is secured.

Then, when the "setting" key is pressed, the displayed contents are outputted to the control unit 11. The control unit 11 generates a bandwidth control table and a QoS entry which will be described later.

Similarly, on the QoS setting screen, as for the priority degree control, a desired priority degree is inputted in correspondence to the set of a transmission source address and a destination IP address.

In the example of FIG. 3, in the communication from terminal #2 (192.168.0.1/32) to terminal #6 (192.168.1.1/32) indicated as number 1, the priority degree "1 (highest)" is inputted.

Then, when the "setting" key is pressed, the displayed contents are outputted to the control unit 11. The control unit 11 generates a priority degree control table and a QoS entry which will be described later.

In this manner, in the present communication device, it is possible to generate the QoS control information in which the bandwidth and the priority degree are set, in correspondence to the combination of the transmission source and the destination arbitrarily selected by the administrator.

In the present communication device, since the bandwidth control and the priority degree control can be set independently, it is possible to control either or both of the bandwidth and the priority degree.

[Bandwidth Control Table: FIG. 4]

Next, the bandwidth control table generated based on the contents of the QoS setting screen will be described with reference to FIG. 4. FIG. 4 is an explanatory diagram showing an example of a bandwidth control table.

As shown in FIG. 4, the bandwidth control table is generated based on the information inputted in the bandwidth control area of the QoS setting screen shown in FIG. 3 and is configured to store setting device information, a transmission source IP address, a destination IP address and a bandwidth setting value.

The setting device information indicates a device to which the information has been set (inputted). In this case, the setting device information indicates the communication device itself (communication device #2).

Further, when displaying the QoS setting screen next, the control unit 11 reads the information of the bandwidth control table and displays it in the bandwidth control area.

[Priority Degree Control Table: FIG. 5]

Next, the priority degree control table generated based on the contents of the QoS setting screen will be described with reference to FIG. 5. FIG. 5 is an explanatory diagram of the priority degree control table.

As shown in FIG. 5, the priority degree control table is also generated based on the contents of the QoS setting screen and is configured to store setting device information, a transmission source IP address, a destination IP address and a priority degree value.

Further, when displaying the QoS setting screen next, the control unit 11 reads the information of the priority degree control table and displays it in the priority degree control area.

[QoS Entry: FIGS. 6A and 6B]

Further, in the present communication device, a QoS entry is generated based on the bandwidth control table and the priority degree control table.

The QoS entry is information serving as a reference when performing QoS control at the time of data packet communication.

At the same time, the present communication device floods the QoS control information as a control message of the ad hoc routing protocol to another communication device based on the QoS entry generated by each communication device. The control message for transmitting the QoS control information is referred to as a QoS control notification message.

Thus, in the ad hoc network configured by the present communication device, the QoS control information can be shared between the communication devices. The QoS of the actual IP packet can be performed based on the shared information.

The QoS entry will be described with reference to FIGS. 6A and 6B. FIGS. 6A and 6B are an explanatory diagram showing an example of a QoS entry of communication device #2.

The QoS entry is stored in the routing information base 15. As shown in FIGS. 6A and 6B, the QoS entry stores not only the QoS control information inputted from the QoS setting screen in the communication device itself, but also the QoS entry information (QoS control information) extracted from the QoS control notification message transmitted from another communication device.

In the QoS entry, there are stored the number, setting device information, a transmission source IP address, a destination IP address, a bandwidth control value, a priority degree value and a bandwidth control priority degree.

The number is assigned to each kind of QoS control information.

The setting device information stores information of a transmission source of the QoS control information.

In the example of FIGS. 6A and 6B, numbers 1 to 4 are the QoS control information inputted by communication device #2 (the communication device itself), numbers 5 to 7 are the QoS control information transmitted from communication device #4 (neighborhood node) shown in FIG. 2, and numbers 8 to 9 are the QoS control information transmitted from communication device #5 (2HOP node) shown in FIG. 2.

The transmission source IP address indicates the transmission source of a IP packet to be subjected to the QoS control.

The destination IP address indicates the destination of the IP packet to be subjected to the QoS control.

Furthermore, the bandwidth control priority degree is the information indicating the priority degree of a process for securing a bandwidth in the communication device itself.

In the present communication device, a process for securing a bandwidth for an IP packet is sequentially performed according to the bandwidth control priority degree of the QoS entry. Consequently, even when a plurality of IP packets is simultaneously received, it is possible to prevent the congestion of communication.

The bandwidth control priority degree of the QoS control information set in the communication device itself is allocated from 1. However, the bandwidth control priority degree of the QoS control information set in the neighborhood node is allocated from 31, and the bandwidth control priority degree of the QoS control information of the 2HOP node is allocated from 61.

The setting of the bandwidth control priority degree will be described in a process of receiving the QoS control notification message.

In other words, in the present communication device, the bandwidth is preferentially allocated to the IP packet corresponding to the QoS control information set by the communication device itself. Thus, it is possible to preferentially process the data transmitted from the communication device itself or the terminal connected to the communication device itself.

In the ad hoc network configured by the present communication device, the QoS control information stored in each communication device is flooded by a QoS control notification message to be described later, and the QoS control information can be shared in the network.

However, the bandwidth control priority degree (and the arrangement order) of the QoS entry varies in each communication device.

Figure 7:
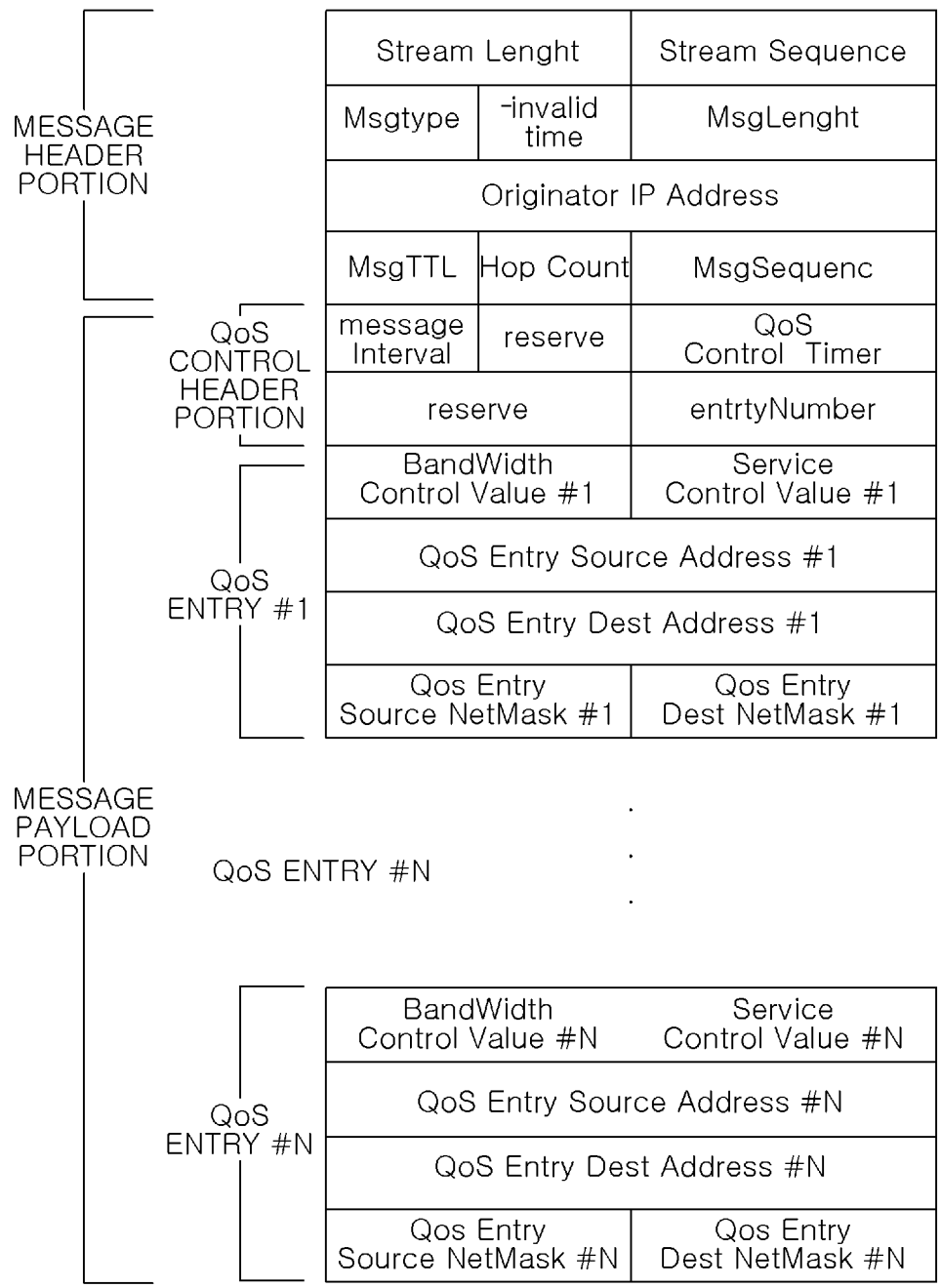
FIG. 7 is an explanatory diagram showing a format of a QoS control notification message.

[QoS Control Notification Message Format: FIG. 7]

Next, the format of a QoS control notification message will be described with reference to FIG. 7. FIG. 7 is an explanatory diagram showing the format of a QoS control notification message.

The QoS control notification message is a control message for sharing the QoS control information between the communication devices that construct a network, and is transmitted from a communication terminal in which the QoS control information is set.

As shown in FIG. 7, the QoS control notification message is composed of a message header portion and a message payload portion. The message payload portion includes a QoS header portion indicating the QoS control message and QoS entry information (QoS control information). Multiple pieces of QoS entry information may be stored. In this case, QoS entry information #1 to QoS entry information #N are stored.

In the QoS header portion, the transmission interval of the QoS control message is stored in the Message Interval, the time for validating the contents described in the QoS entry information is stored in the QoS Control Timer, and the number of QoS entry information included in the message is stored in the Entry Number.

In each QoS entry information, a bandwidth control value (Bandwidth Control Value), a priority degree control value (Service Control Value), a transmission source IP address (QoS Entry Source Address), a destination IP address (QoS Entry Dest Address) are stored.

QoS Entry Source Net Mask and QoS Entry Dest Net Mask store the subnet mask 8 bits of the transmission source IP address and the destination IP address.

The QoS control notification message is generated by the QoS control message generating unit 14 and is transmitted from the wireless interface (Wireless MAC) 23 according to the message interval of the Message Interval via the control unit 11 and the routing table 20.

The transmission process and the reception process of the QoS control notification message will be described later.

[Example of QoS Control Notification Message: FIGS. 2 and 8]

Next, an example of the QoS control notification message will be described with reference to FIGS. 2 and 8. FIG. 8 is an explanatory diagram of the QoS control notification message indicating the QoS control information for the IP packet from terminal #2 to terminal #6 in FIG. 2.

As shown in FIG. 8, the QoS control notification message concerning the communication from terminal #2 to terminal #6 is described in the format shown in FIG. 7. The IP address (192.168.0.1) of terminal #2 is described in the transmission source, the IP address (192.168.1.1) of terminal #6 is described in the destination, and the value (32) indicating the terminal is described in the QoS Entry Source Net Mask and the QoS Entry Dest Net Mask.

Then, 1000 [1 Mbps] is set as the bandwidth control value, and 3F [highest] is set as the priority degree control value.

Figure 9:
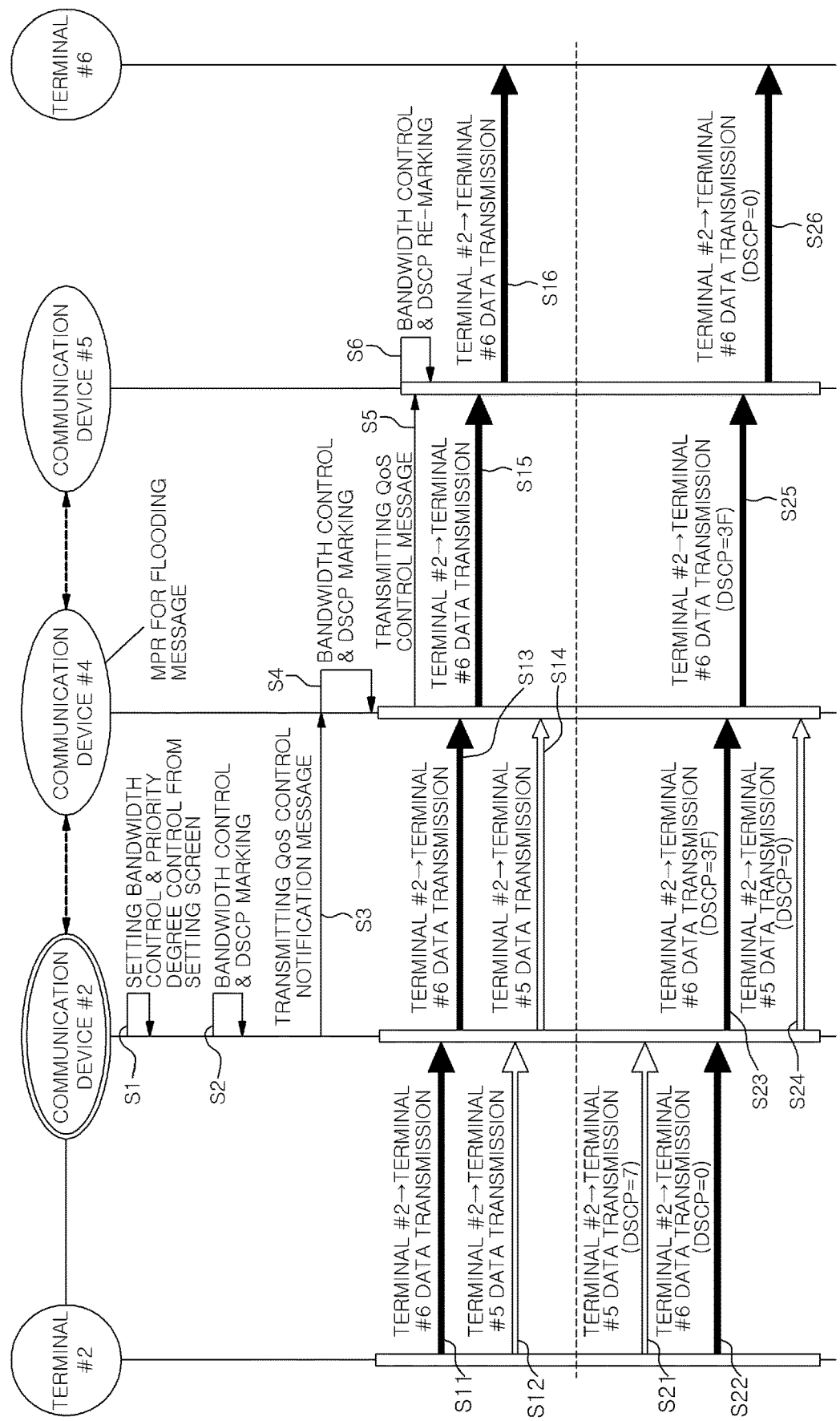
FIG. 9 is a sequence diagram showing a sequence example of QoS control in the network shown in FIG. 2.

[Sequence Example of QoS Control in Network Composed of the Present Communication Device: FIGS. 2 and 9]

Next, a sequence of QoS control in a network (main network) composed of the present communication device will be described with reference to FIGS. 2 and 9. FIG. 9 is a sequence diagram showing a sequence example of QoS control in the network shown in FIG. 2.

The upper part of FIG. 9 shows a sequence in which QoS control information is shared between communication devices.

As shown in the upper part of FIG. 9, first, when the band control for guaranteeing a wide bandwidth and the information for assuring a high priority degree are set on the setting screen of the communication device #2 with respect to the communication of terminal #2→terminal #6 (S1), the control unit 11 generates a bandwidth control table and a priority degree control table in correspondence to the combination of a transmission source and a destination (terminal #2→terminal #6) based on the setting contents (S2). The control unit 11 stores the QoS control information based thereon in the QoS entry of the routing information base 15.

Thus, when communication device #2 receives the IP packet of terminal #2→terminal #6, the bandwidth control unit 19 controls the bandwidth according to the instruction from the control unit 11 based on the QoS entry, and the DSCP marking unit 18 performs DSCP marking and transmits it to the next node.

Then, based on the QoS entry, communication device #2 generates a QoS control notification message (see FIG. 8) in the QoS control message generating unit 14 and floods the QoS control notification message via the control unit 11 and the routing table 21 just like the TC message (S3).

In this case, as shown in FIG. 2, communication device #2 also transmits the QoS control notification message to communication devices #1, #3 and #4.

Upon receiving the QoS control notification message from communication device #2, communication device #4 analyzes the message in the QoS control message analyzing unit 16 to extract QoS control information. Communication device #4 adds the QoS control information for specifying the bandwidth control and the priority degree in correspondence to the IP packet of terminal #2→terminal #6, to the QoS entry and stores it in the routing information base 15 (S4).

Thus, when communication device #4 receives the IP packet of terminal #2→terminal #6, the bandwidth control unit 19 controls the bandwidth based on the QoS entry, and the DSCP marking unit 18 performs and transmits DSCP marking.

Since communication device #4 itself is an MPR, communication device #4 floods the QoS control notification message and transmits it to communication device #5 (S5).

Communication device #1 and communication device #3 (see FIG. 2) having received the QoS control notification message from communication device #2 do not perform flooding because they are not MPRs. However, communication device #1 and communication device #3 stores the QoS control information in the QoS entry of the routing information base 15 and performs bandwidth control and priority degree control with respect to the received IP packet.

Upon receiving the QoS control notification message, communication device #5 analyzes the QoS control notification message and stores the QoS control information in the QoS entry.

Further, when receiving the data indicating that the destination is terminal #6 wire-connected to the communication device itself, the control unit 11 of communication device #5 sets bandwidth limitation information in the bandwidth control unit 19. The control unit 11 instructs the DSCP marking unit 18 to perform DSCP re-marking and matches the DSCP with the priority degree of the wired network (S6).

As described above, in the present network, by flooding the QoS control notification message according to the ad hoc protocol, all the communication devices making up the network acquire the common QoS control information. This makes it possible to realize QoS control even in the communication from the terminal to the terminal, thereby guarantying the quality of communication.

Next, an example of communication in the present network will be described with reference to FIG. 9.

The middle part in FIG. 9 shows a case where only the bandwidth control is performed. A wide bandwidth is guaranteed for the IP packet from terminal #2 to terminal #6.

When the data addressed to terminal #6 is transmitted from terminal #2 (S11) and when the data addressed to terminal #5 is transmitted from terminal #2 (S21), communication device #2 first allocates a wide bandwidth to the data addressed to terminal #6 having a high bandwidth control priority degree based on the QoS entry and instructs the bandwidth control unit 19.

As a result, the data addressed to terminal #6 is transmitted in a wide bandwidth (S13), and the data addressed to terminal #5 is transmitted in a narrow bandwidth (S14).

Further, in communication device #4, the data addressed to terminal #6 is transmitted in a wide bandwidth (S15). The data is also transmitted in a wide bandwidth from communication device #5 to terminal #6 (S16). Thus, communication can be performed at a high communication speed.

On the other hand, the data addressed to terminal #5 is allocated a narrow band at the time of transmission from communication device #2 to communication device #4. Thus, the communication speed is lowered.

The lower part in FIG. 9 shows a case where priority degree control is performed in addition to the bandwidth control. A wide bandwidth is guaranteed and a high priority degree is set for the IP packet from terminal #2 to terminal #6.

When the data addressed to terminal #6 and the data addressed to terminal #5 are inputted to terminal #2, the information of the priority degree in the original wired network is stored in the DSCP from terminal #2, and the data is transmitted (S32 and S22).

In this case, the data addressed to terminal #5 is set to have a low priority degree, i.e., DSCP=7, and the data addressed to terminal #6 is set to have a high priority degree, i.e., DSCP=0.

Upon receiving the data addressed to terminal #5 and the data addressed to terminal #6, communication device #2 first processes the data addressed to terminal #6 having a high bandwidth control priority degree and a high priority degree value based on the QoS entry stored in the routing information base 15, allocates a wide bandwidth based on the corresponding QoS control information, rewrites the DSCP value of the received data, and transmits the data to communication device #4 of the next node in a wide bandwidth (S23). In this case, the DSCP value is rewritten so that DSCP=3F.

In addition, the data addressed to terminal #5 is subjected to a marking process for rewriting the DSCP value so that DSCP=0, based on the QoS entry, and is transmitted to communication device #4 in a narrow bandwidth (S24).

In communication device #4, the marking setting for rewriting the DSCP value of the data addressed from terminal #2 to terminal #6 is performed with the already stored QoS entry. However, the same value (DSCP=3F) is overwritten. Then, the data addressed to the marked terminal #6 is transmitted to communication device #5 in a wide bandwidth (S25).

The data addressed to terminal #5 is transmitted from communication device #4 via a wired network.

In communication device #5, upon receiving the data addressed to terminal #6, the control unit 11 recognizes that the destination is terminal #6 wire-connected to the communication device itself, and instructs the DSCP marking unit 18 to perform a marking process. Then, the DSCP marking unit 18 rewrites the DSCP of the data addressed to terminal #6 into the value set in the wired network (DSCP=0) and transmits it via the wired interface (S26).

As described above, in the communication between terminal #2 and terminal #6, the bandwidth is guaranteed and the transmission process is given a priority.

Figure 10:
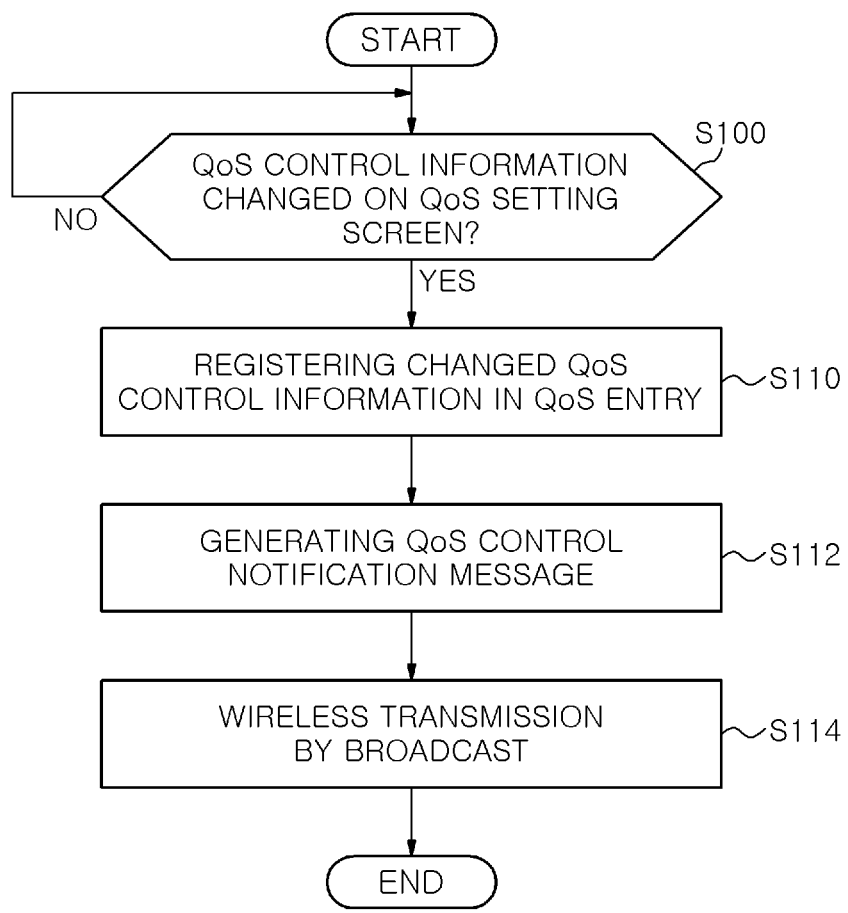
FIG. 10 is a flowchart showing a process of transmitting a QoS control notification message in the communication device.

[QoS Control Notification Message Transmission Process: FIG. 10]

Next, the transmission process of a QoS control notification message in the present communication device will be described with reference to FIG. 10. FIG. 10 is a flowchart showing a process of transmitting a QoS control notification message in the present communication device.

In the present communication device, when an operation is performed on the QoS setting screen of the communication device itself, a QoS control notification message is transmitted in order to transmit QoS control information to another communication device.

As shown in FIG. 10, the control unit 11 of the present communication device monitors whether or not the QoS control information has been changed from the QoS setting screen (S100). If the QoS control information has not been changed (if No), the control unit 11 continues to monitor.

If the QoS control information has been changed in step S100 (if Yes), the QoS control information is registered in the QoS entry shown in FIGS. 6A and 6B based on the changed contents (S112).

Then, the QoS control message generating unit 14 generates a QoS control notification message based on the QoS entry (S 112). When reaching a transmission cycle of the QoS control notification message, the control message transmitting unit 12 wirelessly transmits the QoS control notification message via the wireless interface by virtue of broadcast (S 114).

In this way, the transmission process of the QoS control notification message is performed.

Figure 11:
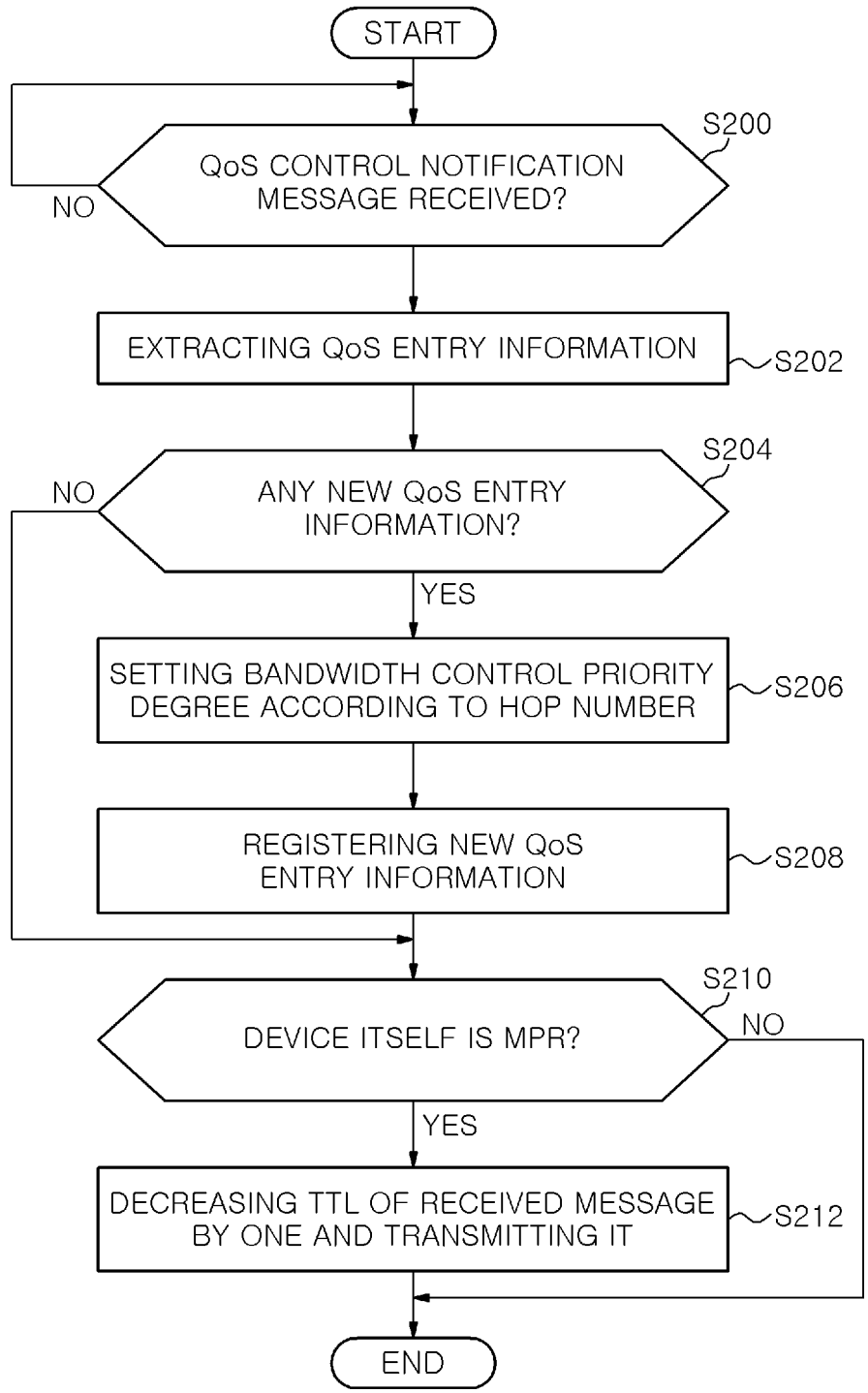
FIG. 11 is a flowchart showing a process of receiving a QoS control notification message in the communication device.

[QoS Control Notification Message Reception Process: FIG. 11]

Next, the reception process of the QoS control notification message in the present device will be described with reference to FIG. 11. FIG. 11 is a flowchart showing a process of receiving a QoS control notification message in the present communication device.

As shown in FIG. 11, the control message receiving unit 13 of the present device monitors whether or not a QoS control notification message has been received (S200). If not received (if No), the control message receiving unit 13 continues to monitor.

If the QoS control notification message has been received (if Yes), the control message receiving unit 13 outputs the message to the QoS control message analyzing unit 16. The QoS control message analyzing unit 16 extracts the QoS entry information contained in the message by the amount of Entry Number (S202) and outputs it to the control unit 11.

The control unit 11 determines whether there is new QoS entry information (new QoS control information) (S204). If there is no new QoS entry information (if No), the control unit 11 proceeds to the process S210.

If it is determined in process S204 that there is new QoS entry information (If Yes), the bandwidth control priority degree is set according to the number of HOPs of the transmission source of the QoS control notification message (S206).

Specifically, if it is a neighborhood node, 30 is added to the requested bandwidth control priority degree (the number of the received QoS entry information). If it is a 2 HOP node, 60 is added to the requested bandwidth control priority degree, thereby setting the bandwidth control priority degree.

Then, the control unit 11 registers the new QoS control information in the QoS entry (S208). In addition, the validity period is the QoS Control Timer in the message header.

Then, the control unit 11 determines whether or not the communication device itself is an MPR (S210). If the communication device itself is an MPR (if Yes), the control unit 11 decreases the TTL of the received message by one, and transmits the received message to the communication device in which the communication device itself is selected as an MPR (S212).

In addition, if it is determined in process S210 that the communication device itself is not an MPR (if No), the control section 11 terminates the process.

In this manner, the QoS control notification message reception process is performed.

By the process shown in FIGS. 10 and 11, in the network composed of the present communication device, all the communication devices constructing the network share the QoS control information. This makes it possible to guarantee communication with respect to the entire transmission route including the terminals wire-connected to the respective communication devices and to realize various kinds of communication services.

Figure 12:
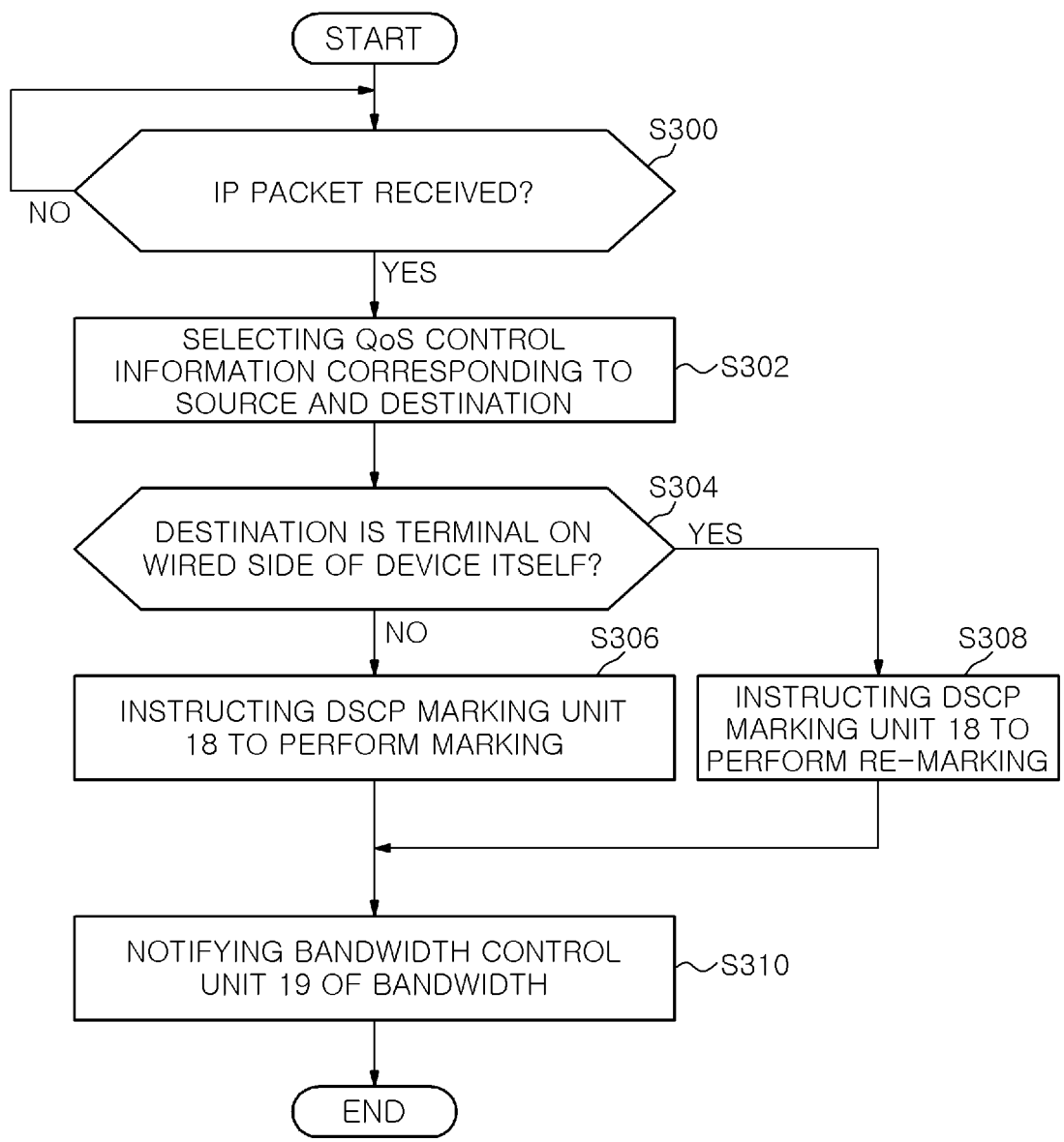
FIG. 12 is a flowchart showing a process at the time of IP packet reception.

[Process at the Time of Reception of IP Packet: FIG. 12]

Next, the process at the time of reception of an IP packet in the present communication device will be described with reference to FIG. 12. FIG. 12 is a flowchart showing the process at the time of reception of an IP packet.

As shown in FIG. 12, the control unit 11 waits for reception of an IP packet (S300). If an IP packet is received (If Yes), the control unit 11 reads the transmission source and the destination of the IP packet and selects the QoS control information corresponding to the combination of the transmission source and the destination from the QoS entry stored in the routing information base 15 (S302).

Then, the control unit 11 determines whether or not the destination of the received IP packet is the terminal on the wired side of the communication device itself (the terminal wire-connected to the communication device itself) (S304).

If it is determined in process S304 that the destination of the received IP packet is not the terminal on the wired side of the communication device itself (if No), the control unit 11 instructs the DSCP marking unit 18 to perform a marking process for rewriting the priority degree value to the priority degree value described in the information the DSCP of the received IP packet to the priority degree value described in the selected QoS control information (S306).

If it is determined in process S304 that the destination of the received IP packet is the terminal on the wired side of the communication device itself (if Yes), the control unit 11 instructs the DSCP marking unit 18 to perform a re-marking process for rewriting the DSCP of the received IP packet to the set value on the wired side (S308).

As a result, the priority degree of the data addressed to the terminal wire-connected to the communication device itself is converted to the priority degree on the wired side.

Then, the control unit 11 notifies the bandwidth control unit 19 of the bandwidth control value described in the selected control information (S310).

In this way, the process at the time of receiving the IP packet is performed by the control unit 11.

Figure 13:
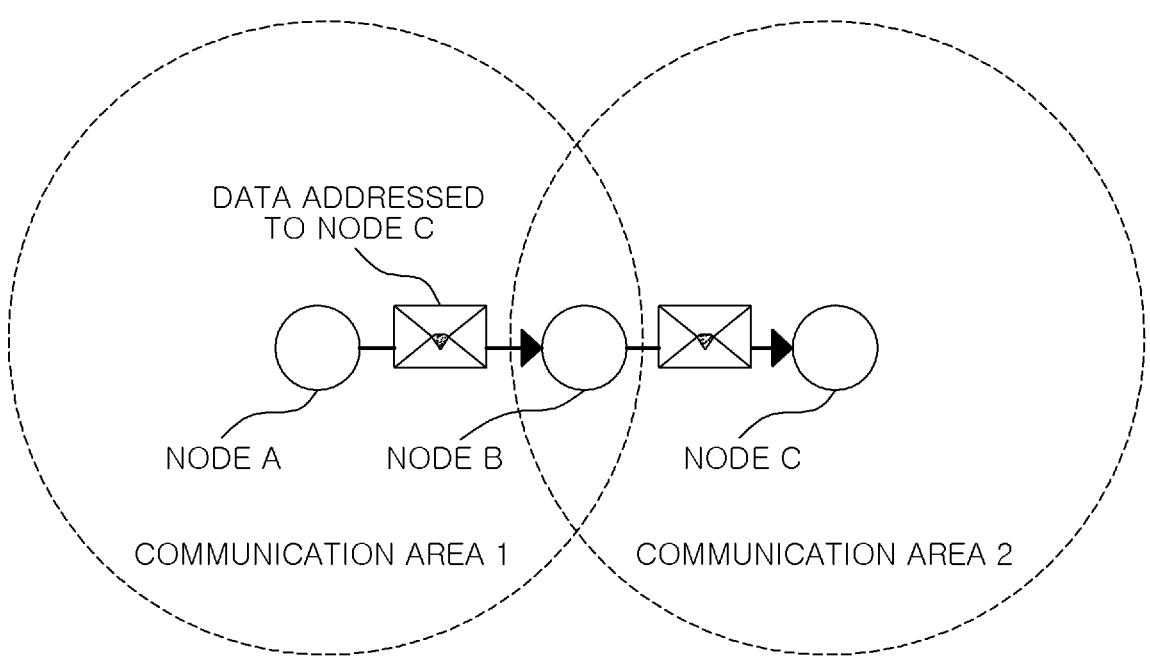
FIG. 13 is a schematic explanatory diagram showing the concept of relay in an ad hoc network.
Figure 14A:
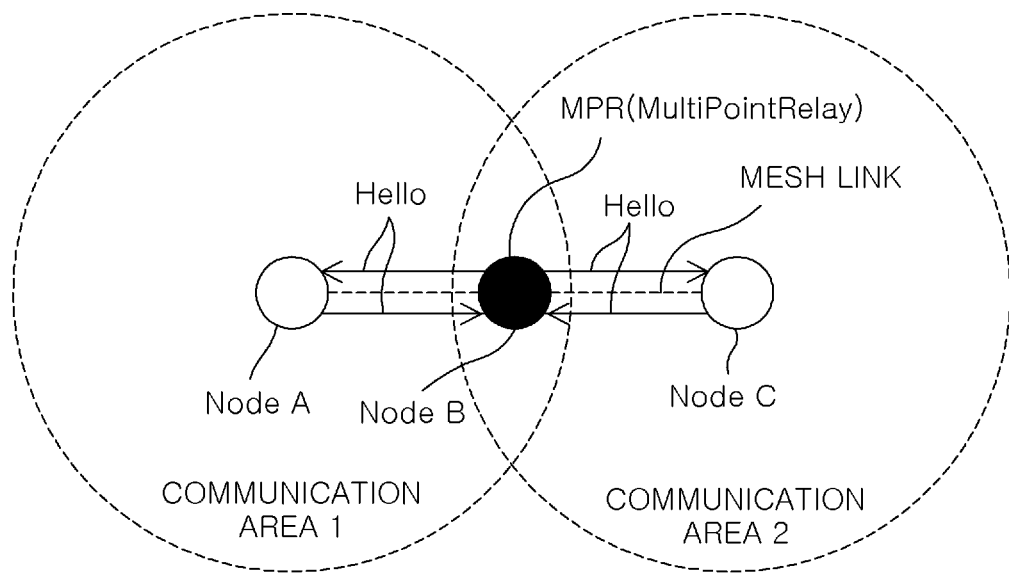
Figure 17A:
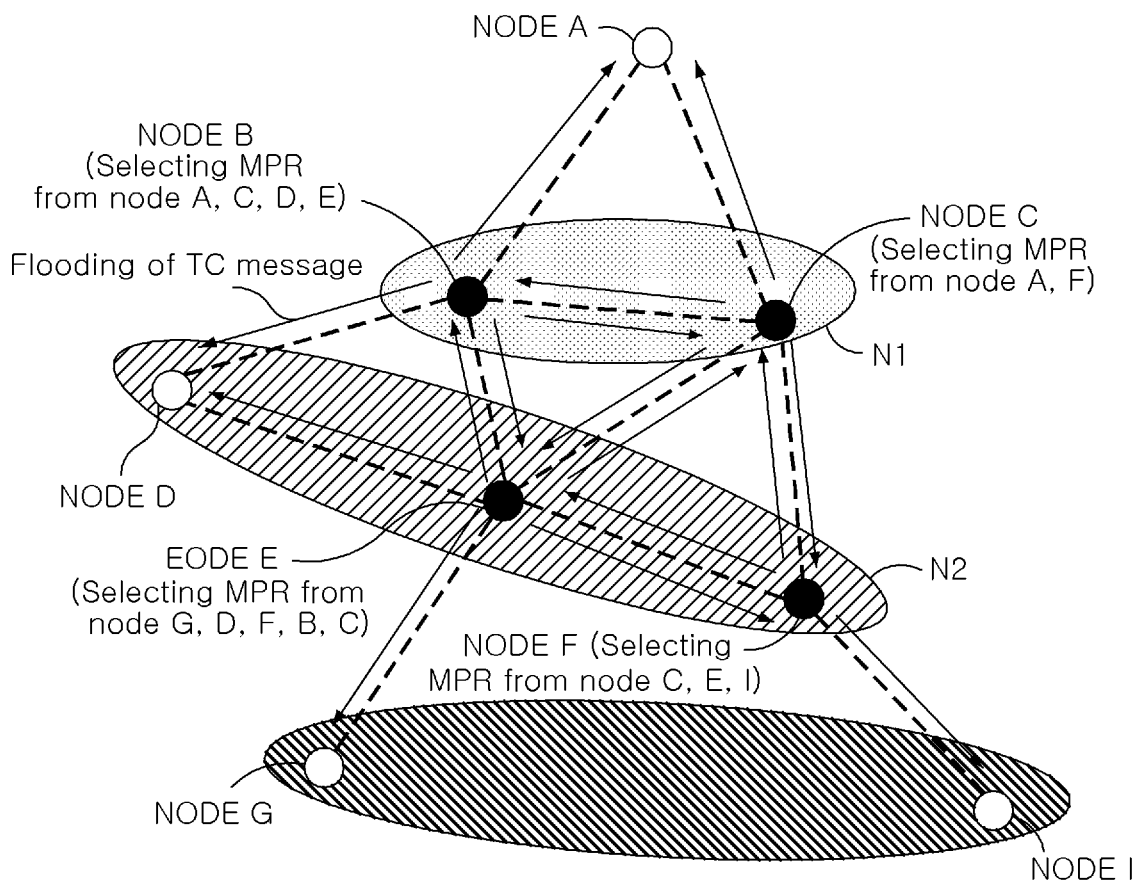
Figure 18A:
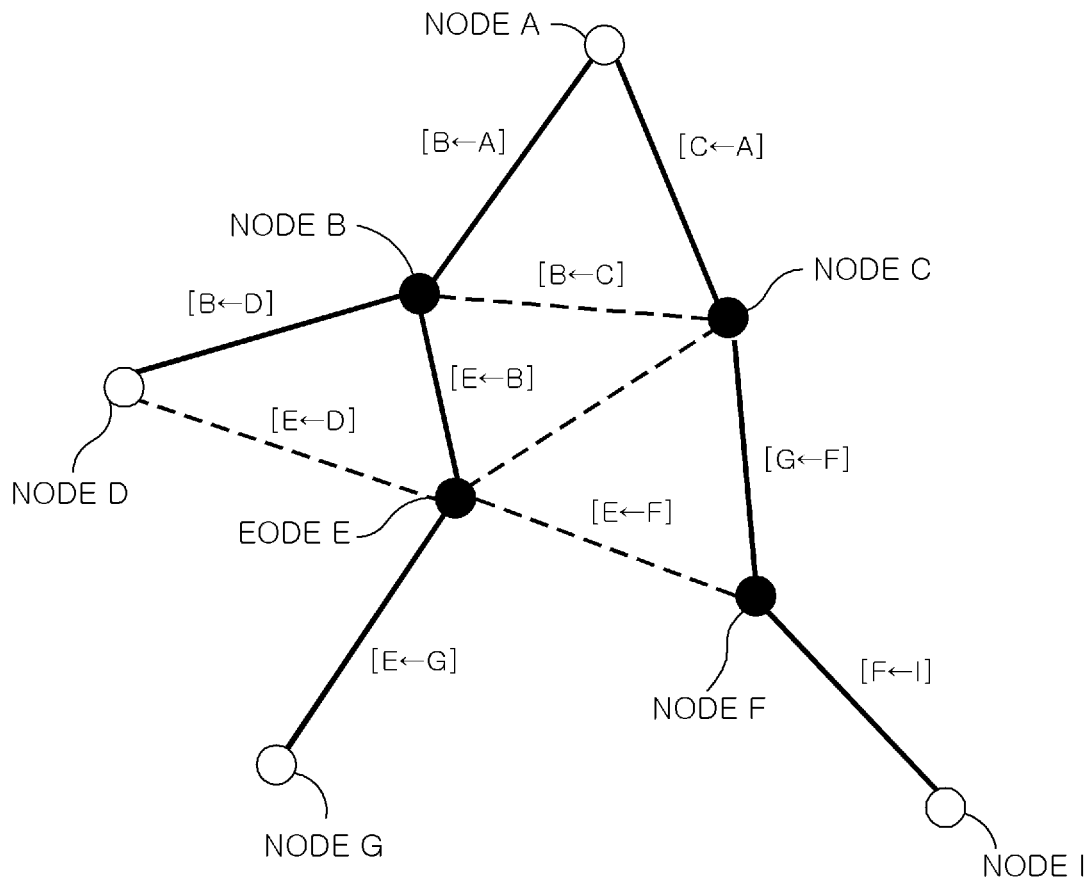
FIGS. 18A and 18B are explanatory diagrams showing an example of route determination based on topology information acquired from a TC message.
Figure 18B:
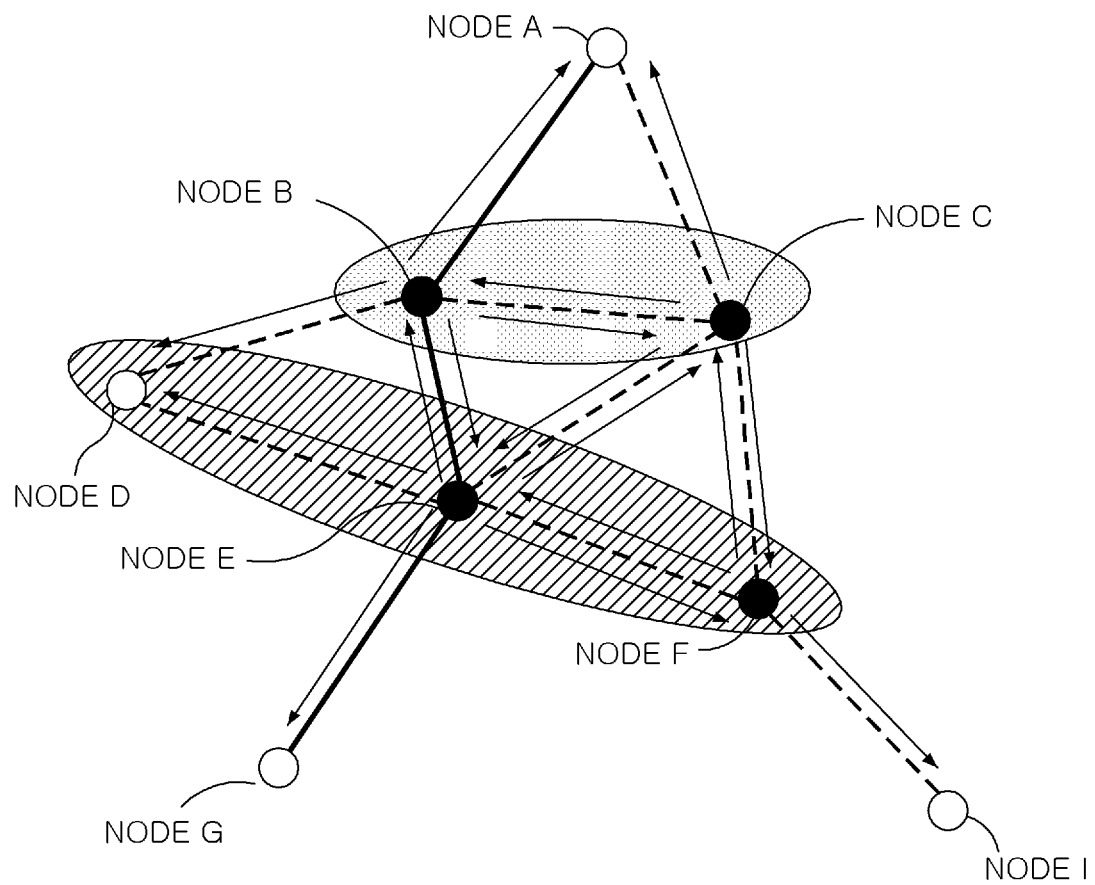
Figure 19A:
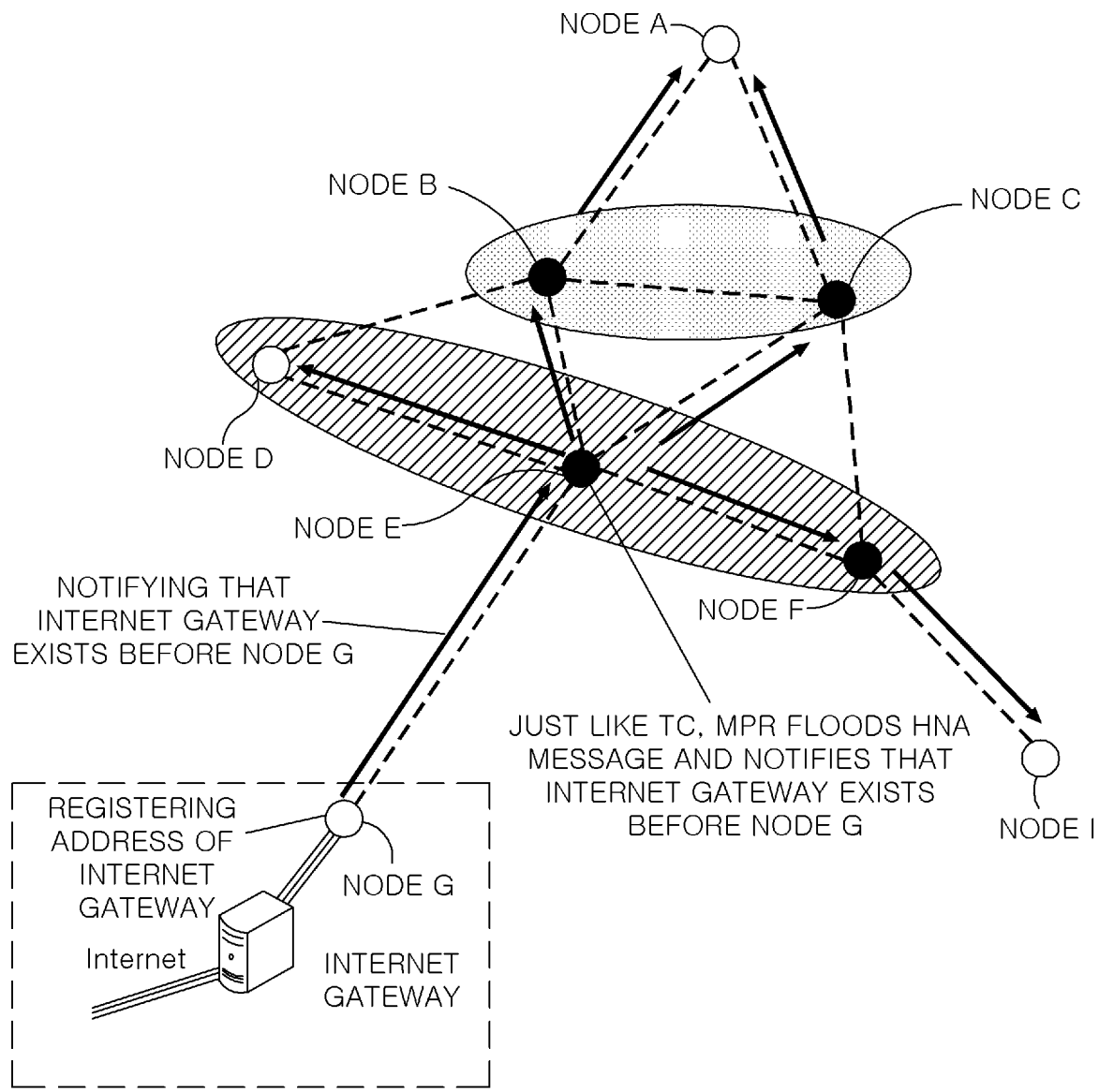

Incidentally, when a plurality of IP packets is received at the same time, the process shown in FIG. 13 is performed according to the bandwidth priority degree of the QoS entry.

As a result, in the wireless section, the IP packet received by the present communication device is subjected to QoS control using the bandwidth and priority degree designated by the QoS control information and is transmitted to the next node. In the wired section, the IP packet is transmitted to the terminal at the priority degree set in the wired network.

That is, in the network composed of the present communication device, it is possible to perform communication at an appropriate bandwidth and priority degree in the entire wireless section according to the combination of the transmission source and the destination of the communication data. By performing the re-marking process, communication is guaranteed even in the wired section.

[Management of QoS Control Information]

Further, in the present communication device, the valid period of the QoS control information stored in the routing information base 15 is periodically checked, whereby the QoS control information whose deadline has expired is deleted from the QoS entry to update the QoS entry.

In this way, the QoS control information is managed.

Effect of Embodiment

According to the communication device and the communication method according to the embodiment of the present invention, a terminal wire-connected to the communication device itself is used as a transmission source. Multiple pieces of QoS control information (QoS entry information) that define a bandwidth control value and a priority degree corresponding to communication data specified by a combination of a transmission source and a destination are stored in a storage unit. When communication data is inputted from the wire-connected terminal, QoS control information matching a combination of a transmission source and a destination of the inputted communication data is selected from among the multiple pieces of QoS control information stored in the storage unit. Bandwidth control and priority degree control are performed based on the selected QoS control information, thereby performing wireless communication. QoS control can be performed by including not only communication devices but also terminals connected to the respective communication devices as the transmission source and the destination. This makes it possible to realize QoS control in the entire network, thereby providing various kinds of services.

Furthermore, the communication device and the communication method according to the embodiment of the present invention, when an IP packet is received, determination is made as to whether the destination is a terminal wire-connected to the communication device itself. If the destination is not a terminal wire-connected to the communication device itself, a marking process for rewriting a DSCP of the IP packet based on QoS control information is performed. If the destination is a terminal wire-connected to the communication device itself, a re-marking process for rewriting the DSCP of the IP packet at a priority degree set in advance by a wired interface is performed. Therefore, even in a wireless section and a wired section, an appropriate priority degree can be set and a communication quality can be guaranteed.

In addition, according to the communication device and the communication method according to the embodiment of the present invention, the storage unit stores QoS control information set from the communication device itself and QoS control information transmitted from another communication device. The bandwidth control priority degree indicating a priority degree of bandwidth control in the communication device itself is set to be higher in QoS control information set from the communication device itself than in QoS control information transmitted from another communication device. Therefore, it is possible to perform a process of preferentially allocating a bandwidth to the transmission data transmitted from the communication device itself or the terminal wire-connected to the communication device itself. This makes it possible to prevent congestion of communication.

INDUSTRIAL APPLICABILITY

The present invention is applied to a communication device and a communication method in which QoS information is shared by all communication devices. This makes it possible to realize QoS control in the entire transmission route including terminals wire-connected to the communication devices constituting a network, thereby realizing various kinds of services. This application claims the benefit of priority based on Japanese Patent Application No. 2015-239611 filed on Dec. 8, 2015, the disclosure of which is incorporated herein by reference in its entirety.

DESCRIPTION OF REFERENCE NUMERALS 10, 90 . . . network module
11, 91 . . . control unit
12, 92 . . . control message transmitting unit
13, 93 . . . control message receiving unit
14 . . . QoS control message generating unit
15, 95 . . . routing information base
16 . . . QoS control message analyzing unit
17 . . . setting interface
18 . . . DSCP marking unit
19 . . . bandwidth control unit
20, 96 . . . routing table
21, 961 . . . routing table cache
22, 98 . . . wired interface
23, 99 . . . wireless interface
94, 14 . . . control message generating unit

What is claimed is:

1. A communication device, for performing communication with a terminal connected to the communication device itself by a wired network and for performing wireless communication with other communication devices in a wireless network formed by the other communication devices and the communication device itself, comprising:
a storage unit configured to store multiple pieces of QoS control information each defining a bandwidth control value in correspondence to communication data specified by a combination of a transmission source and a destination;
a control unit configured to perform QoS control of communication data based on the QoS control information; and
a bandwidth control unit configured to perform bandwidth control of transmission data in wireless communication according to a n instruction;
a setting interface configured to set a QoS control information;
a control message generating unit configured to generate a message including a QoS control information; and
a control message receiving unit configured to receive a message including a QoS control information from other communication devices,
wherein when communication data is inputted, the control unit selects QoS control information corresponding to a combination of a transmission source and a destination of the communication data from among the multiple pieces of QoS control information stored in the storage unit and specifies a bandwidth control value defined by the selected QoS control information with respect to the bandwidth control unit,
the multiple pieces of QoS control information comprise first QoS control information received from another communication device in addition to second QoS control information set from the communication device itself so that the second QoS control information further defines a transmission source as the terminal connected to the communication device itself by the wired network, with the first QoS control information further defining a transmission source as a communication device among the other communication devices,
wherein a message including the first QoS control information, which has been flooded by the another communication device, is received by the control message receiving unit and the second QoS control information is set by using the setting interface of the communication device itself and a message including the second QoS control information is generated by the control message generating unit,
the control unit sets a bandwidth control priority degree indicating a priority degree of bandwidth control in the communication device itself with respect to each of the multiple pieces of QoS control information, and during the setting, the control unit sets a bandwidth control priority degree of the second QoS control information to become higher than a bandwidth control priority degree of the first QoS control information and stores the set bandwidth control priority degree in the storage unit, and
when communication data is inputted, a bandwidth control value is specified with respect to the bandwidth control unit according to a bandwidth control priority degree of QoS control information corresponding to a combination of a transmission source and a destination of the communication data
wherein the control unit sets the bandwidth control priority degree of the first QoS control information according to a number of HOPs of a transmitting device of the first QoS control information.

2. The communication device of claim 1, further comprising:
a priority degree control unit configured to control a priority degree of communication data,
wherein a priority degree in addition to a bandwidth control value is defined in the QoS control information, and
when communication data is inputted, the control unit selects QoS control information corresponding to a combination of a transmission source and a destination of the communication data from among the multiple pieces of QoS control information stored in the storage unit and specifies a priority degree defined by the selected QoS control information with respect to the priority degree control unit.

3. The communication device of claim 2, wherein when communication data is inputted, the control unit determines whether or not a destination of the communication data is a terminal connected to the communication device itself by a wired network, and if the destination of the communication data is not the terminal connected to the communication device itself by the wired network, the control unit instructs the priority degree control unit to perform a marking process for rewriting priority degree information contained in the communication data to a priority degree defined by QoS control information corresponding to a transmission source and a destination, and if the destination of the communication data is the terminal connected to the communication device itself by the wired network, the control unit instructs the priority degree control unit to perform a re-marking process for rewriting priority degree information contained in the communication data to a priority degree set in advance in the wired network.

4. A communication method in a communication device for performing communication with a terminal connected to the communication device itself by a wired network and for performing wireless communication with other communication devices in a wireless network formed by the other communication devices and the communication device itself, the communication device including a storage unit, a control unit, a bandwidth control unit, a setting interface, a control message generating unit and a control message receiving unit, wherein:

multiple pieces of QoS control information each defining a bandwidth control value and a priority degree in correspondence to communication data specified by a combination of the a transmission source and a destination are stored in advance in a the storage unit; and when communication data is inputted a the control unit selects QoS control information corresponding to a combination of a transmission source and a destination of the communication data from among the multiple pieces of QoS control information stored in the storage unit and performs bandwidth control and priority degree control based on a bandwidth control value and a priority degree defined by the selected QoS control information, the multiple pieces of QoS control information comprise first QoS control information received from another communication device in addition to second QoS control information set from the communication device itself so that the second QoS control information further defines a transmission source as the terminal connected to the communication device itself by the wired network, with the first QoS control information further defining a transmission source as a communication device among the other communication devices, and the second QoS control information further defining a transmission source as the communication device itself or the terminal connected thereto by the wired network, wherein a message including the first QoS control information, which has been flooded by the another communication device, is received by the control message receiving unit and the second QoS control information is set by using the setting interface of the communication device itself and a message including the second QoS control information is generated by the control message gene rating unit, the control unit sets a bandwidth control priority degree indicating a priority degree of bandwidth control in the communication device itself with respect to each of the multiple pieces of QoS control information, and during the setting, the control unit sets a bandwidth control priority degree of the second QoS control information to become higher than a bandwidth control priority degree of the first QoS control information and stores the set bandwidth control priority degree, when communication data is inputted, the control unit specifies a bandwidth control value according to a bandwidth control priority degree of QoS control information corresponding to a combination of a transmission source and a destination of the communication data wherein the control unit sets the bandwidth control priority degree of the first QoS control information according to a number of HOPs of a transmitting device of the first QoS control information.

* * * * *